US007390098B2

(12) United States Patent
Wada

(10) Patent No.: US 7,390,098 B2
(45) Date of Patent: Jun. 24, 2008

(54) PROJECTION LENS, AND PROJECTION DISPLAY APPARATUS AND REAR PROJECTION DISPLAY APPARATUS USING THE PROJECTION LENS

(75) Inventor: Mitsuhiro Wada, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 287 days.

(21) Appl. No.: 10/573,874

(22) PCT Filed: Jun. 24, 2004

(86) PCT No.: PCT/JP2004/009259

§ 371 (c)(1), (2), (4) Date: Mar. 29, 2006

(87) PCT Pub. No.: WO2005/033765

PCT Pub. Date: Apr. 14, 2005

(65) Prior Publication Data

US 2006/0285079 A1 Dec. 21, 2006

(30) Foreign Application Priority Data

Sep. 30, 2003 (JP) ............................. 2003-340428

(51) Int. Cl.
*G03B 21/14* (2006.01)

(52) U.S. Cl. .......................... 353/101; 353/97; 359/684; 359/739

(58) Field of Classification Search ................... 353/97, 353/101; 359/649, 676, 684, 740
See application file for complete search history.

(56) References Cited

U.S. PATENT DOCUMENTS 5,187,509 A * 2/1993 Iwasaki ...................... 353/101
5,361,107 A * 11/1994 Ishibe ........................ 353/101
5,597,223 A * 1/1997 Watanabe et al. ............. 353/97
6,123,425 A * 9/2000 Ohzawa ....................... 353/69
6,129,437 A 10/2000 Koga et al.
6,283,599 B1 * 9/2001 Lin ............................ 353/101
6,467,912 B1 * 10/2002 Kato .......................... 353/101

(Continued)

FOREIGN PATENT DOCUMENTS

JP 2000-98272 4/2000

(Continued)

*Primary Examiner*—William C. Dowling
(74) *Attorney, Agent, or Firm*—Hamre, Schumann, Mueller & Larson, P.C.

(57) ABSTRACT

A projection lens that, though designed for right projection, shows good aberration performance and can realize specifications required for a projection display apparatus, such as a low F number, a wide angle, a long back focus, and a high relative illumination, with a rational configuration is provided. A projection lens 1 of the present invention for magnifying and projecting an optical image formed on a spatial light modulator (disposed near an image plane 5) onto a screen 4 is constituted by a front lens group 2 and a rear lens group 3 that are arranged in this order from the screen 4 side toward the image plane 5 side. The rear lens group 3 is provided with a aperture stop 6 that is eccentric with respect to an optical axis 7 common to the front lens group 2 and the rear lens group 3. Focus adjustment is performed by moving the rear lens group 3 in a direction of the optical axis 7 without rotating it.

27 Claims, 18 Drawing Sheets

U.S. PATENT DOCUMENTS

| | | | |
|---|---|---|---|
| 6,671,102 | B2 | 12/2003 | Wada |
| 6,937,401 | B2 | 8/2005 | Sugano |
| 2002/0154276 | A1 | 10/2002 | Narimatsu et al. |
| 2003/0137744 | A1 | 7/2003 | Kuwa et al. |

FOREIGN PATENT DOCUMENTS

| | | |
|---|---|---|
| JP | 2001-42211 | 2/2001 |
| JP | 2003-15033 | 1/2003 |
| JP | 2003-202492 | 7/2003 |
| JP | 2003-255226 | 9/2003 |
| JP | 2003-255229 | 9/2003 |
| WO | 98/29773 | 7/1998 |
| WO | 02/16994 | 2/2002 |

* cited by examiner

PROJECTION LENS, AND PROJECTION DISPLAY APPARATUS AND REAR PROJECTION DISPLAY APPARATUS USING THE PROJECTION LENS

TECHNICAL FIELD

The present invention relates to a projection lens for magnifying and projecting an optical image formed on a spatial light modulator onto a screen, and a projection display apparatus and a rear projection display apparatus using the projection lens.

BACKGROUND ART

Conventionally, projection display apparatuses using various types of spatial light modulators have been known as video equipment for use with a large screen. Recently, reflective spatial light modulators with high display efficiency, such as a DMD (Digital Micro-Mirror Device), have been receiving attention (see JP 2000-98272A, for example).

FIG. 29 shows a configuration of a projection display apparatus using a DMD as a spatial light modulator. FIG. 29A shows a plan view, and FIG. 29B shows a side view. Moreover, FIG. 30 shows a schematic diagram for explaining the operating principle of the DMD.

As shown in FIG. 29, the projection display apparatus includes a lamp 251 for emitting white light, an ellipsoidal mirror 252 for collecting light emitted from the lamp 251, an UV-IR cut-off filter 253 for eliminating ultraviolet rays and infrared rays from the light emitted from the lamp 251, a rotary color filter 254 that is disposed near a long focus of the ellipsoidal mirror 252 and selectively transmits the three primary colors, red (R), green (G), and blue (B), in sequence, a condensing lens 256, a plane mirror 257, a DMD 258 for modulating incident light to form an optical image, and a projection lens 259 for magnifying and projecting the optical image formed on the DMD 258 onto a screen (not shown).

The rotary color filter 254 is formed by combining red, green, and blue color filters into the form of a disc, and when the rotary color filter 254 is rotated with a motor 255, it can selectively transmit red, green, and blue colors of light of the light collected by the ellipsoidal mirror 252 in sequence. Thus, red, green, and blue colors of illumination light are supplied onto the DMD 258 in sequence.

The condensing lens 256 collects divergent light that has passed though the rotary color filter 254 and directs the light efficiently to the DMD 258 and the projection lens 259.

As shown in FIG. 30, the DMD 258 has a two-dimensional array of microscopic mirrors 261 that are provided in one-to-one correspondence with pixels. For each pixel, tilting of the microscopic mirror 261 is controlled based on the electrostatic field effect of a memory device that is provided directly under the microscopic mirror 261, and the angle of reflection of incident light is changed, thereby forming the ON/OFF states.

Here, a case where the microscopic mirrors tilt±10° with respect to the DMD plane will be described with reference to FIG. 31. FIG. 31 is a schematic diagram showing the operating principle of the microscopic mirrors on the DMD. As shown in FIG. 31, when light 272 tilting 20° with respect to a normal to the device plane of the DVD enters the DMD, if a microscopic mirror 261 is in the ON state (the tilt angle is +10°), then reflected light 273 enters the projection lens 259, and a white pixel is displayed on the screen. On the other hand, if the microscopic mirror 261 is in the OFF state (the tilt angle is −10°), then reflected light 274 does not enter the projection lens 259, and a black pixel is displayed on the screen. Therefore, by controlling the ON/OFF switching for each pixel with time, a gradation expression can be achieved. Moreover, by simultaneously driving the DMD according to the color of illumination light supplied thereto, color display can be performed.

As shown in FIG. 30, the microscopic mirrors 261 on the DMD 258 tilt, for example, in a direction at an azimuth of 45° with respect to a long axis 262 of the display area.

As shown in FIG. 29, the plane mirror 257 is disposed such that it folds the optical path of light from the condensing lens 256 three-dimensionally so as to allow that light to enter the DMD 258 at a predetermined incident angle.

It should be noted that in order to prevent interference between the projection lens 259 and an optical component such as the plane mirror 257, the angle between the optical axis of illumination light and the optical axis of projection light is required to be as large as possible. For this reason, a central axis 258*a* of the DMD 258 does not coincide with an optical axis 260 of the projection lens 259, and the DMD 258 and the projection lens 259 are arranged with their optical axes offset (shifted) from each other. Therefore, the projection lens 259 uses only a part of the angle of view of an effective image circle to project an optical image formed on the DMD 258.

Generally, projection lenses used in projection display apparatuses as described above are subject to the following requirements.

First, the projection lenses are required to have high resolution. This requirement is important in projecting a high-definition image for high-definition television, for example, and to meet this requirement, it is necessary that the projection lenses have good aberration performance including distortion.

Second, the projection lenses are required to have a low F number. This requirement is important in creating a bright projected image, and to meet this requirement, it is desired that the projection lenses are capable of collecting light from a light valve over a wide angle.

Third, the projection lenses are required to have high aperture efficiency even in the periphery of the screen. This requirement is important in suppressing a decrease in light quantity in a peripheral portion of a projected image on the screen.

Fourth, the projection lenses are required to be capable of realizing projection onto a large screen with a short projection distance. That is to say, it is desired that the projection lenses are wide angle lenses, and to meet this requirement, a lens having a relatively short focal length is necessary.

Fifth, the projection lenses are required to have a sufficiently long back focus space. This requirement is important in separating projection light and illumination light from each other and reserving a sufficient space in which an optical component can be arranged.

Sixth, the projection lenses are required to provide high image quality and high uniformity of brightness.

When actually designing a lens, how to realize these performance requirements rationally in a configuration suitable for mass production is critical.

However, conventional projection lenses and projection display apparatuses using those conventional projection lenses had the following problems.

Generally, to realize a lens with a more rational configuration, reducing the F number and achieving better aberration performance are requirements that are mutually contradictory. Moreover, this applies to increasing the angle of view and reserving a long back focus.

Therefore, it has been very difficult to realize a rational projection lens suitable for mass production while satisfying all of the above-described performance requirements.

Moreover, conventionally, it has been common to arrange the spatial light modulator and the projection lens with their optical axes offset from each other and perform offset projection in order to prevent interference between the optical paths of projection light and illumination light or interference between the projection lens and an optical component such as the plane mirror (see FIG. 29). Offset projection is a method of projecting an image with the display area of the spatial light modulator to be projected being displaced within the effective image circle of the projection lens, and the use of this method causes a loss of the symmetry of the angle of view in the projected image. Consequently, when offset projection was employed, there was a problem in that resolution and brightness of the projected image were asymmetric with respect to the center of the screen. Moreover, only a part of the angle of view of the effective image circle was used, which was wasteful and ran counter to rationalization. Furthermore, when offset projection was employed in a rear projection display apparatus configured with a transmission-type screen, it was necessary to offset the transmission-type screen, too, and thus there was a problem in that offset projection was not suited for rear projection display apparatuses in terms of rationalization.

To address these problems, a configuration (hereinafter, referred to as "right projection") in which a total reflection prism is disposed between a projection lens and a spatial light modulator (e.g., a DMD) to eliminate the need for offsetting the projection system has been proposed conventionally (see International Publication No. WO98/29773, for example).

However, since the total reflection prism is very expensive, this configuration ran counter to rationalization of a projection system including the projection lens. Moreover, since the total reflection prism contains a minute air layer, there also was a problem of a significant deterioration in the aberration performance of the projection lens due to the gap tolerance of that air layer.

DISCLOSURE OF INVENTION

The present invention was achieved in order to solve the foregoing problems in the conventional technology, and it is an object of the present invention to provide a projection lens that, though designed for right projection, shows good aberration performance and can realize specifications required for a projection display apparatus, such as a low F number, a wide angle, a long back focus, a high relative illumination, with a rational configuration. Also, it is an object of the present invention to provide a projection display apparatus and a rear projection display apparatus that are capable of providing bright, high-quality image display by using the projection lens.

In order to attain the object, a configuration of the projection lens according to the present invention is a projection lens for magnifying and projecting an optical image formed on a spatial light modulator onto a screen, including:

a front lens group and a rear lens group that are arranged in this order from the screen side toward an image plane side, wherein the rear lens group has an aperture stop that is eccentric with respect to an optical axis common to the front lens group and the rear lens group, and focus adjustment is performed by moving the rear lens group in a direction of the optical axis without rotating the rear lens group.

In the configuration of the projection lens according to the present invention, it is preferable that magnification adjustment is performed by moving the front lens group in the direction of the optical axis.

In the configuration of the projection lens according to the present invention, it is preferable that the projection lens further includes an auxiliary lens group between the rear lens group and the image plane. Moreover, in this case, it is preferable that the auxiliary lens group includes a single plano-convex lens whose convex surface faces the screen side.

Moreover, in this case, it is preferable that the front lens group includes a first lens group having a negative power, the rear lens group includes a second lens group having a positive power and a third lens group having a positive power that are arranged in this order from the screen side, the auxiliary lens group includes a fourth lens group having a positive power, and when an axial air gap between the first lens group and the second lens group is t12, an axial air gap between the third lens group and the fourth lens group is t34, and a focal length of the entire system is f, the following conditions are satisfied:

$$6.2<t12/f<10.5 \quad (1)$$

$$2.7<t34/f<4.4 \quad (2)$$

In this case, it is further preferable that the first lens group includes a negative meniscus lens whose convex surface faces the screen side and at least one surface of which is aspherical, and a negative lens that are arranged in this order from the screen side, the second lens group includes a positive lens, a cemented lens of a negative lens and a positive lens, and a positive meniscus lens whose convex surface faces the screen side that are arranged in this order from the screen side, the third lens group includes a negative meniscus lens whose convex surface faces the screen side, a positive lens, a cemented lens of a positive lens and a negative lens, a positive lens, and a positive lens that are arranged in this order from the screen side, and the fourth lens group includes a single positive lens.

Furthermore, in this case, it is preferable that when an Abbe number and a refractive index of the positive lens constituting the cemented lens included in the second lens group are respectively ν2p and n2p, and an Abbe number and a refractive index of the negative lens constituting the cemented lens included in the second lens group are respectively ν2n and n2n, the following conditions are satisfied:

$$\nu 2p<\nu 2n \quad (8)$$

$$n2p<n2n \quad (9)$$

Furthermore, in this case, it is preferable that when an Abbe number and a refractive index of the positive lens constituting the cemented lens included in the third lens group are respectively ν3p and n3p, and an Abbe number and a refractive index of the negative lens constituting the cemented lens included in the third lens group are respectively ν3n and n3n, the following conditions are satisfied:

$$\nu 3p>\nu 3n \quad (10)$$

$$n3p<n3n \quad (11)$$

In this case, it is further preferable that the first lens group includes a negative meniscus lens whose convex surface faces the screen side and at least one surface of which is aspherical, and a negative lens that are arranged in this order from the screen side, the second lens group includes a positive lens, a negative meniscus lens whose convex surface faces the screen side, and a positive meniscus lens whose convex surface faces the screen side that are arranged in this order from the screen side, the third lens group includes a first cemented lens of a negative lens and a positive lens, a second cemented lens of a negative lens and a positive lens, and a positive lens that are arranged in this order from the screen side, and the fourth lens group includes a single positive lens.

Furthermore, in this case, it is preferable that when an Abbe number and a refractive index of the positive lens constituting the cemented lens included in the third lens group are respectively $\nu 3p$ and n3p, and an Abbe number and a refractive index of the negative lens constituting the cemented lens included in the third lens group are respectively $\nu 3n$ and n3n, the following conditions are satisfied:

$$\nu 3p > \nu 3n \quad (10)$$

$$n3p < n3n \quad (11)$$

In this case, it is further preferable that the aperture stop is disposed between the second lens group and the third lens group.

In this case, it is further preferable that a lens disposed at a position closest to the screen in the first lens group is an aspherical lens.

In this case, it is further preferable that the auxiliary lens group includes a single plano-convex lens whose convex surface faces the screen side.

In this case, it is further preferable that a lens disposed at a position closest to the spatial light modulator in the third lens group is made of an anomalous dispersion glass.

In this case, it is further preferable that when an axial air gap between the fourth lens group and the image plane is d, the following conditions are satisfied:

$$1.6 < t34/d < 2.6 \quad (3)$$

$$4.2 < (t34+d)/f < 6.0 \quad (4)$$

In this case, it is further preferable that when a focal length of the first lens group is f1, a focal length of the second lens group is f2, and a focal length of the third lens group is f3, the following conditions are satisfied:

$$-2.9 < f1/f < -2.1 \quad (5)$$

$$7.3 < f2/f < 14.5 \quad (6)$$

$$5.7 < f3/f < 7.5 \quad (7)$$

In the configuration of the projection lens according to the present invention, it is preferable that the projection lens further includes an optical path bending means between the front lens group and the rear lens group. Moreover, in this case, it is preferable that the aperture stop is eccentrically displaced in a direction parallel to or a direction perpendicular to a plane containing the optical axes upstream and downstream of the optical path bending means. Moreover, in this case, it is preferable that when an angle between the optical axes upstream and downstream of the optical path bending means is $\theta$, the following relationship is satisfied:

$$45° \leqq \theta \leqq 90° \quad (13)$$

Moreover, in this case, it is preferable that the optical path bending means is a dielectric multilayer mirror.

In the configuration of the projection lens according to the present invention, it is preferable that the aperture stop has an opening having a substantially elliptical shape. Moreover, in this case, it is preferable that when an amount of eccentricity of the aperture stop is D1 and an effective aperture radius in a position of the aperture stop is D2, the following condition is satisfied:

$$D1/D2 < 0.5 \quad (12)$$

In the configuration of the projection lens according to the present invention, it is preferable that an effective display area of the spatial light modulator has a rectangular shape having a long axis and a short axis, and the aperture stop is eccentrically displaced in a direction along the long axis or a direction along the short axis.

Moreover, a configuration of the projection display apparatus according to the present invention is a projection display apparatus, including:

a spatial light modulator for forming an optical image according to a video signal, an illuminating means for illuminating the spatial light modulator, and a projection lens for projecting the optical image formed on the spatial light modulator onto a screen, wherein the projection lens according to the present invention is used as the projection lens.

In the configuration of the projection display apparatus according to the present invention, it is preferable that the spatial light modulator is a DMD (Digital Micro-Mirror Device) including a two-dimensional array of a plurality of microscopic mirrors.

In the configuration of the projection display apparatus according to the present invention, it is preferable that the projection display apparatus further includes a field stop on the screen side of the projection lens.

In the configuration of the projection display apparatus according to the present invention, it is preferable that the illuminating means forms an illumination light that is switched between three primary colors, red (R), green (G), and blue (B), of light with time, and the spatial light modulator displays the optical images corresponding to the three primary colors of light while switching the optical images with time.

Moreover, a configuration of the rear projection display apparatus according to the present invention is a rear projection display apparatus, including:

a projection display apparatus, and a transmission-type screen for displaying an image projected from the projection display apparatus, wherein the projection display apparatus according to the present invention is used as the projection display apparatus.

In the configuration of the rear projection display apparatus according to the present invention, it is preferable that the rear projection display apparatus further includes a reflecting means for bending an optical path that is disposed between the projection display apparatus and the transmission-type screen.

According to the present invention, it is possible to provide a projection lens that is especially suited for use in performing right projection using a reflective spatial light modulator such as a DMD, shows good aberration performance even under bright conditions in which the F number is about 2.0, and can realize specifications required for a projection display apparatus, such as a wide angle, a long back focus, and a high relative illumination, with a rational configuration. Moreover, it is possible to provide compact, low-cost projection display apparatus and rear projection display apparatus that are capable of providing bright, high-quality image display by using the projection lens.

DESCRIPTION OF THE INVENTION

Figure 1:
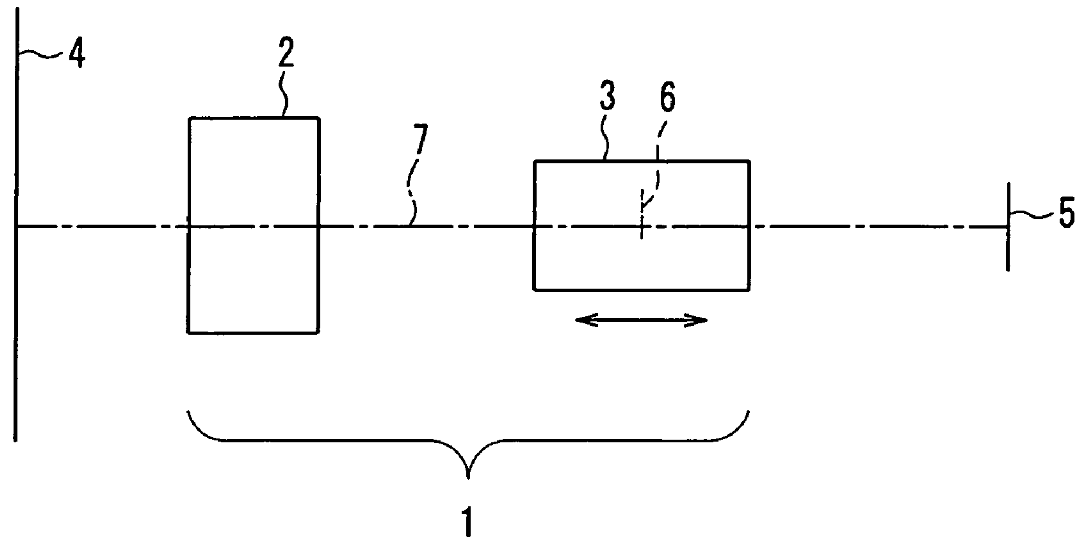
FIG. 1 is a layout drawing showing a basic configuration of a projection lens according to the present invention.
Figure 2:
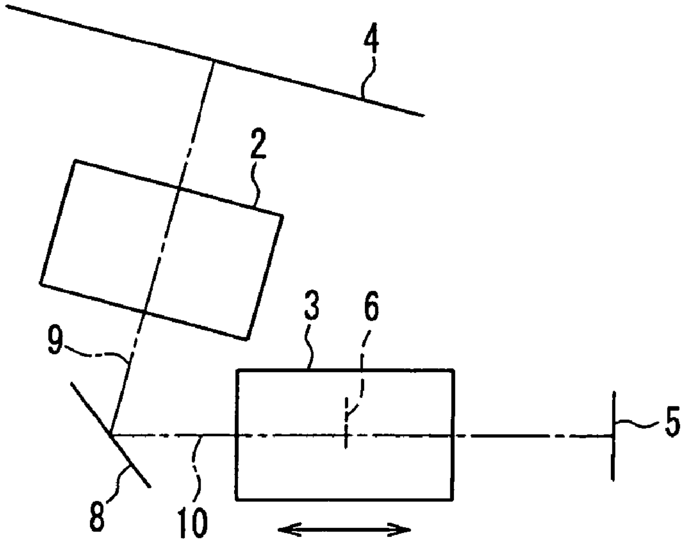
FIG. 2 is a layout drawing showing another configuration (a configuration in which an optical path bending means is added to the basic configuration) of the projection lens according to the present invention.
Figure 3:
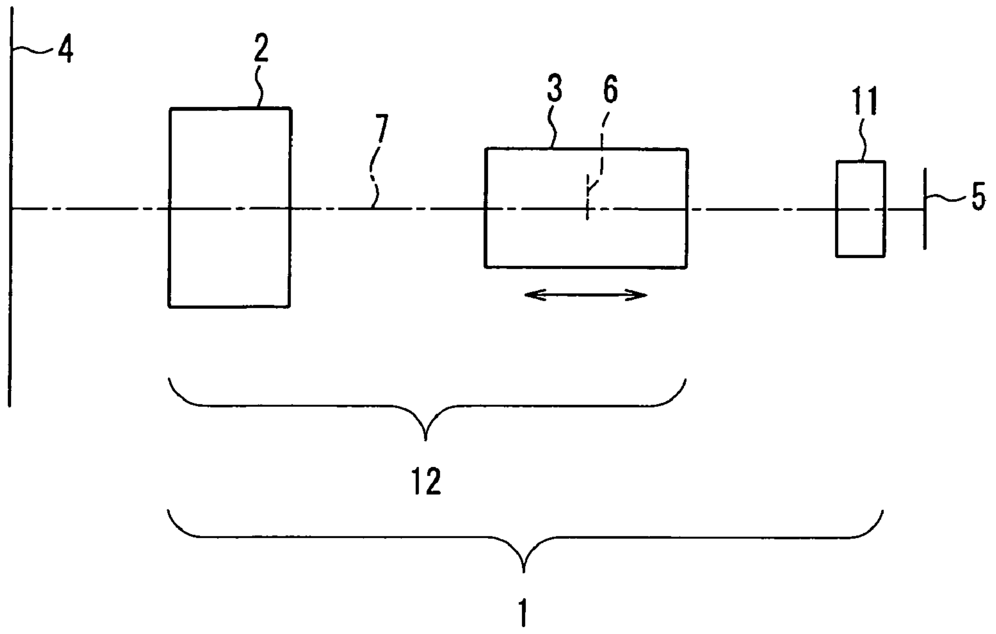
FIG. 3 is a layout drawing showing still another configuration (a configuration in which an auxiliary lens group is added to the basic configuration) of the projection lens according to the present invention.
Figure 4:
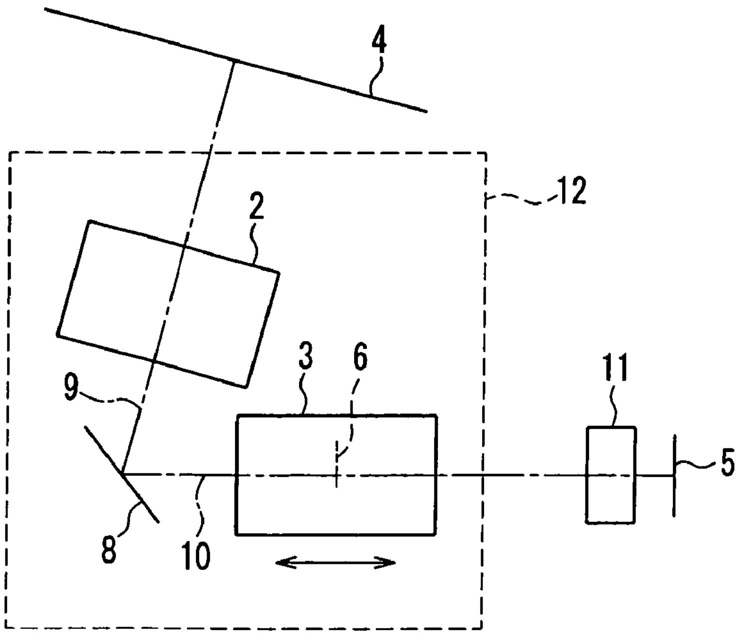
FIG. 4 is a layout drawing showing yet another configuration (a configuration in which the optical path bending means and the auxiliary lens group are added to the basic configuration) of the projection lens according to the present invention.

FIG. 1 is a layout drawing showing a basic configuration of a projection lens according to the present invention. FIG. 2 is a layout drawing showing another configuration (a configuration in which an optical path bending means is added to the basic configuration) of the projection lens according to the present invention. FIG. 3 is a layout drawing showing still another configuration (a configuration in which an auxiliary lens group is added to the basic configuration) of the projection lens according to the present invention. FIG. 4 is a layout drawing showing yet another configuration (a configuration in which the optical path bending means and the auxiliary lens group are added to the basic configuration) of the projection lens according to the present invention.

As shown in FIG. 1, a projection lens 1 of the present invention for magnifying and projecting an optical image formed on a spatial light modulator (disposed near an image plane 5) onto a screen 4 includes a front lens group 2 and a rear lens group 3 that are arranged in this order from the screen 4 side toward the image plane 5 side.

The rear lens group 3 has an aperture stop 6 that is eccentric with respect to an optical axis 7 common to the front lens group 2 and the rear lens group 3.

Focus adjustment is performed by moving the rear lens group 3 in the direction of the optical axis 7 without rotating it.

Magnification adjustment preferably is performed by moving the front lens group 2 in the direction of the optical axis 7.

Moreover, as shown in FIG. 2, a configuration in which a plane mirror 8 serving as an optical path bending means is disposed between the front lens group 2 and the rear lens group 3 is also possible. Also in this case, the aperture stop 6 is eccentric with respect to optical axes 9 and 10 common to the front lens group 2 and the rear lens group 3. It should be noted that in this case, it is preferable that the aperture stop 6 is displaced eccentrically in a direction parallel to or perpendicular to a plane containing the optical axes 9 and 10 upstream and downstream of the plane mirror 8.

Moreover, as shown in FIG. 3, a configuration in which the front lens group 2 and the rear lens group 3 are used as a main lens group 12 and an auxiliary lens group 11 is disposed between the main lens group 12 and the image plane 5 is also possible. Also in this case, as shown in FIG. 4, a configuration in which the plane mirror 8 serving as the optical path bending means is disposed between the front lens group 2 and the rear lens group 3 is possible.

Hereinafter, the present invention will be described in greater detail by means of specific embodiments. First, a configuration in which the aperture stop is not eccentric will be described in Reference Examples 1 to 4 below, and then, a configuration in which the aperture stop is made eccentric will be described in the following first embodiment.

REFERENCE EXAMPLE 1

Figure 5:
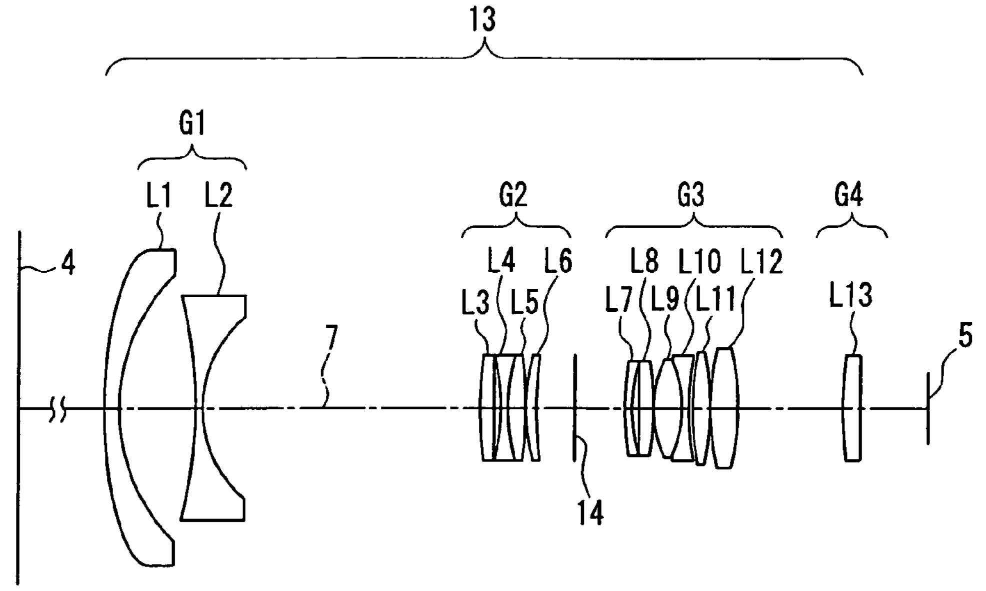
FIG. 5 is a layout drawing showing a configuration of a projection lens of Reference Example 1.

FIG. 5 is a layout drawing showing a configuration of a projection lens of Reference Example 1.

As shown in FIG. 5, a projection lens 13 of this reference example is constituted by a first lens group G1 having a negative power and composed of two lenses L1 and L2, which serves as the front lens group, a second lens group G2 having a positive power and composed of four lenses L3, L4, L5, and L6, which serves as the rear lens group, and a third lens group G3 having a positive power and composed of six lenses L7, L8, L9, L10, L11, and L12, which also serves as the rear lens group, and a fourth lens group G4 having a positive power and composed of a single lens L13, which serves as the auxiliary lens group, that are arranged in this order from the screen 4 side toward the image plane 5 side.

Moreover, an aperture stop 14 is disposed between the second lens group G2 and the third lens group G3.

In the projection lens 13 of this reference example, the first to fourth lens groups G1 to G4 and the image plane 5 are arranged such that an optical axis 7 common to the first to fourth lens groups G1 to G4 passes through the center of the image plane 5, and thus it is possible to perform right projection of an optical image formed on the spatial light modulator onto the screen 4. In the present specification, "an optical axis passes through the center of an image plane" means not only the case where the optical axis passes through exactly the center of the image plane but also cases with an allowable error.

The following (Table 1) shows specific numerical examples for the lenses of the projection lens 13 shown in FIG. 5.

TABLE 1

| Lens | i-th surface | ri | di | ni | vi |
|---|---|---|---|---|---|
| L1 | 1 | 164.134 | 3.800 | 1.49015 | 57.2 |
| | 2 | 39.178 | 22.566 | | |
| L2 | 3 | −145.947 | 2.000 | 1.58913 | 61.3 |
| | 4 | 31.636 | 98.000 | | |
| L3 | 5 | 132.437 | 3.300 | 1.80609 | 33.3 |
| | 6 | −716.525 | 1.800 | | |
| L4 | 7 | −49.478 | 1.500 | 1.69680 | 55.5 |
| L5 | 8 | 34.302 | 5.000 | 1.64769 | 33.8 |
| | 9 | −133.727 | 0.300 | | |
| L6 | 10 | 47.032 | 3.500 | 1.64769 | 33.8 |
| | 11 | 174.892 | 10.000 | | |
| | 12 | Infinity | 14.704 | | |
| L7 | 13 | 105.245 | 1.500 | 1.80609 | 33.3 |
| | 14 | 46.491 | 2.000 | | |
| L8 | 15 | 931.813 | 4.000 | 1.51680 | 64.2 |
| | 16 | −71.322 | 0.300 | | |
| L9 | 17 | 54.736 | 7.500 | 1.49700 | 81.6 |
| L10 | 18 | −33.119 | 1.500 | 1.80609 | 33.3 |
| | 19 | 70.960 | 1.200 | | |
| L11 | 20 | 88.324 | 4.300 | 1.49700 | 81.6 |
| | 21 | −73.673 | 0.300 | | |
| L12 | 22 | 68.948 | 7.700 | 1.49700 | 81.6 |
| | 23 | −60.557 | 40.000 | | |
| L13 | 24 | 75.500 | 5.000 | 1.83400 | 37.3 |
| | 25 | Infinity | 16.410 | | |

(Aspherical surface data)

| Lens | i-th surface | cc | A4 | A6 | A8 | A10 |
|---|---|---|---|---|---|---|
| L1 | 1 | −138.58270 | 3.39809E−06 | −4.79187E−10 | −7.64881E−14 | 6.80210E−17 |
| | 2 | −0.73495 | −3.42123E−06 | 6.95073E−09 | −6.21352E−12 | 1.43583E−15 |

In the above (Table 1), ri represents the radius of curvature (mm) of a surface (i-th surface) that is the i-th from the screen 4 side, di represents the distance (axial distance, surface spacing) (mm) along the optical axis 7 between a surface (i-th surface) that is the i-th and a surface ((i+1)-th surface) that is the (i+1)-th from the screen 4 side, ni represents the refractive index of a lens that is the i-th from the screen 4 side with respect to the d line, and νi represents the Abbe number of a lens that is the i-th from the screen 4 side with respect to the d-line (which apply to other reference examples and embodiments described later).

Moreover, the focal length of the entire system is f=9.851 mm, the F number is F no.=2.00, and the half angle of view is ω=45.4°.

Both surfaces of the lens L1 on the screen 4 side that constitutes the first lens group G1 are aspherical, and the aspherical shape is defined by (Formula 1) below (which applies to other reference examples and embodiments described later).

$$x=(y^2/r)\Big/\left(1+\sqrt{1-(cc+1)y^2/r^2}\right)+A4\cdot y^4+A6\cdot y^6+A8\cdot y^8+A10\cdot y^{10} \quad \text{Formula 1}$$

In the above (Formula 1), cc represents the conical coefficient, A4, A6, A8, and A10 represent the fourth-, sixth-, eighth-, and tenth-order aspherical coefficients, respectively, r represents the radius of curvature, x represents the sag amount (the position of a surface in the optical axis direction), and y represents the height from the optical axis. The above (Table 1) also shows specific numerical examples of the aspherical coefficients.

In the projection lens 13 of this reference example, when the focal length of the entire system is f, the axial distance (axial air gap) between the first lens group G1 and the second lens group G2 is t12, and the axial air gap between the third lens group G3 and the fourth lens group G4 is t34, it is preferable that the following conditions are satisfied:

$$6.2<t12/f<10.5 \quad (1)$$

$$2.7<t34/f<4.4 \quad (2)$$

The formulae (1) and (2) are the conditions for reserving relatively long air gaps between the first lens group G1 and the second lens group G2 and between the third lens group G3 and the fourth lens group G4 while achieving good aberration performance. If the upper limit of the formula (1) is exceeded, then not only is the lens length too long, resulting in an increase in the size of the projection lens 13, but also vignetting increases in outer edges of the angle of view, resulting in a decrease in brightness at a peripheral portion of the screen. If the lower limit of the formula (1) is exceeded, then the negative power of the first lens group G1 is too large, making it difficult to correct the distortion and the coma in particular. Moreover, if the lower limit of the formula (1) is exceeded as described above, then practical considerations, such as disposing a plane mirror for bending an optical path between the first lens group G1 and the second lens group G2, become difficult. If the upper limit of the formula (2) is exceeded, then the back focus is too long, making it difficult to correct the aberrations. If the lower limit of the formula (2) is exceeded, then the projection lens 13 and an optical component for illumination tend to interfere with each other, making it difficult to arrange the optical component for illumination between the third lens group G3 and the fourth lens group G4.

Moreover, in the projection lens 13 of this reference example, when the axial air gap between the fourth lens group G4 and the image plane 5 is d, it is preferable that the following conditions are satisfied:

$$1.6<t34/d<2.6 \quad (3)$$

$$4.2<(t34+d)/f<6.0 \quad (4)$$

When designed to satisfy the formulae (3) and (4), the projection lens 13 can achieve even higher performance and also has an extended application range.

The formulae (3) and (4) are the conditions for addressing, while achieving good aberration performance, problems that arise in practical use when the projection lens is combined with an illumination system, such as a decrease in the contrast and interference with an optical component for illumination. If the upper limit of the formula (3) is exceeded, then the fourth lens group G4 and the image plane 5 are too close to each other, so that unwanted reflections between the spatial light modulator disposed near the image plane 5 and the fourth lens group G4 cause stray light, resulting in the occurrence of ghosting and a decrease in the contrast. If the lower limit of the formula (3) is exceeded, then the aperture of the fourth lens group G4 increases, so that the size of the single lens L13 constituting the fourth lens group G4 is increased, leading to an increase in the cost. If the upper limit of the formula (4) is exceeded, then the back focus is too long, making it difficult to correct the aberrations. Moreover, in this case, in order to correct the aberrations sufficiently, a sufficient lens overall length is necessary, so that the size of the projection lens 13 is increased. If the lower limit of the formula (4) is exceeded, then the back focus is reduced, so that the projection lens 13 and an optical component for illumination tend to interfere with each other in practical use.

Moreover, in the projection lens 13 of this reference example, when the focal length of the first lens group G1 is f1, the focal length of the second lens group G2 is f2, and the focal length of the third lens group G3 is f3, it is preferable that the following conditions are satisfied:

$$-2.9<f1/f<-2.1 \quad (5)$$

$$7.3<f2/f<14.5 \quad (6)$$

$$5.7<f3/f<6.9 \quad (7)$$

The formulae (5) to (7) are the conditions for further supplementing the aberration performance, and by satisfying these conditions (5) to (7), the power distribution of the first lens group G1, the second lens group G2, and the third lens group G3 can be set appropriately, and thus higher imaging performance can be achieved.

The following (Table 2) shows values of the above-described conditions regarding the projection lens 13 of this reference example described above.

TABLE 2

| | | |
|---|---|---|
| t12/f = 9.9 | t34/f = 4.0 | |
| t34/d = 2.4 | (t34 + d)/f = 5.7 | |
| f1/f = −2.7 | f2/f = 13.9 | f3/f = 6.5 |

In order to correct the aberrations, it is preferred that a combined focal length f12 of the first lens group G1 and the second lens group G2 is positive. A negative combined focal length f12 means an increase in the negative power of the first lens group G1, so that the distortion and the coma are increased. For the projection lens 13 of this reference example, the combined focal length of the first lens group G1 and the second lens group G2 is f12=2768 mm.

Figure 6:
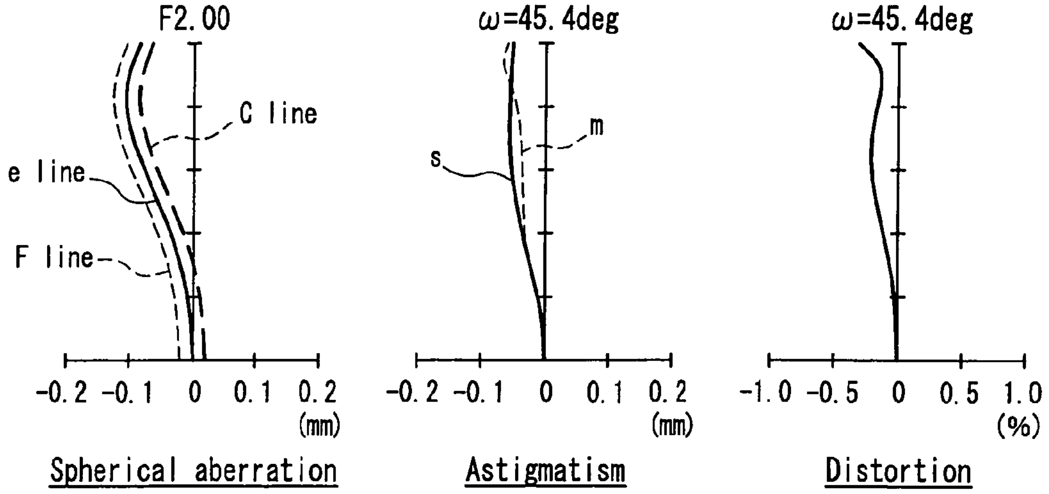
FIG. 6 shows aberration performance charts (spherical aberration, astigmatism, distortion) of the projection lens of Reference Example 1.

FIG. 6 shows aberration performance charts (spherical aberration, astigmatism, distortion) of the projection lens 13 shown in FIG. 5. In the chart showing the spherical aberration, the solid line indicates a value for the e line (546 nm), the long dashed line indicates a value for the C line (656 nm), and the short dashed line indicates a value for the F line (486 nm). In the chart showing the astigmatism, the solid line indicates a value in the sagittal direction (s), and the dashed line indicates a value in the meridional direction (m) (which applies to other reference examples and embodiments described later).

As is clear from the aberration performance charts shown in FIG. 6, it is seen that in the projection lens 13 of this reference example, the aberrations were corrected sufficiently by satisfying the various conditions described above, and thus good imaging performance was achieved.

REFERENCE EXAMPLE 2

Figure 7:
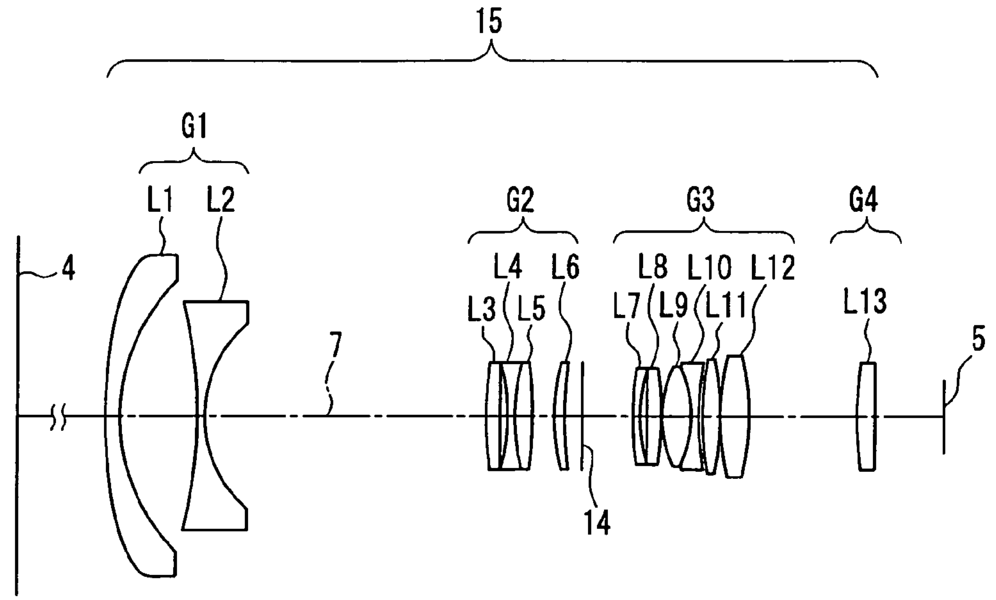
FIG. 7 is a layout drawing showing a configuration of a projection lens of Reference Example 2.

FIG. 7 is a layout drawing showing a configuration of a projection lens of Reference Example 2. A projection lens 15 of this reference example is the same as the projection lens 13 of Reference Example 1 with regard to the basic configuration from the first lens group G1 to the fourth lens group G4 and the positional relationship between the optical axis 7 and the image plane 5.

The projection lens 15 of this reference example is different from the projection lens 13 of Reference Example 1 in the power distribution and the parameters such as the surface spacing of the lenses constituting the first lens group G1, the second lens group G2, the third lens group G3, and the fourth lens group G4.

The following (Table 3) shows specific numerical examples for the lenses of the projection lens 15 shown in FIG. 7.

TABLE 3

| Lens | i-th surface | ri | di | ni | vi |
|---|---|---|---|---|---|
| L1 | 1 | 88.734 | 3.800 | 1.49015 | 57.2 |
| | 2 | 32.175 | 21.641 | | |
| L2 | 3 | −192.835 | 2.000 | 1.62041 | 60.3 |
| | 4 | 24.846 | 68.000 | | |
| L3 | 5 | 70.074 | 3.000 | 1.80609 | 33.3 |
| | 6 | 423.730 | 1.800 | | |
| L4 | 7 | −59.297 | 2.000 | 1.69680 | 55.5 |
| L5 | 8 | 42.668 | 5.500 | 1.64769 | 33.8 |
| | 9 | −285.827 | 6.000 | | |
| L6 | 10 | 36.773 | 3.500 | 1.62004 | 36.3 |
| | 11 | 128.435 | 3.500 | | |
| | 12 | Infinity | 15.946 | | |
| L7 | 13 | 83.795 | 2.000 | 1.83400 | 37.3 |
| | 14 | 36.728 | 1.500 | | |
| L8 | 15 | 82.024 | 4.300 | 1.49700 | 81.6 |
| | 16 | −76.736 | 0.300 | | |
| L9 | 17 | 46.611 | 7.200 | 1.49700 | 81.6 |
| L10 | 18 | −25.532 | 2.000 | 1.80609 | 33.3 |
| | 19 | 111.738 | 0.800 | | |
| L11 | 20 | 210.224 | 4.300 | 1.49700 | 81.6 |
| | 21 | −138.279 | 0.300 | | |
| L12 | 22 | 59.664 | 7.000 | 1.49700 | 81.6 |
| | 23 | −58.356 | 31.000 | | |
| L13 | 24 | 65.000 | 5.000 | 1.83400 | 37.3 |
| | 25 | Infinity | 16.410 | | |

(Aspherical surface data)

| Lens | i-th surface | cc | A4 | A6 | A8 | A10 |
|---|---|---|---|---|---|---|
| L1 | 1 | 75.07691 | 4.57640E−06 | 2.15349E−12 | −7.14138E−13 | 3.70308E−16 |
| | 2 | −1.01734 | −4.89142E−06 | 1.36940E−08 | −1.45652E−11 | 4.28218E−15 |

Moreover, the focal length of the entire system is f=10.377 mm, the F number is F no.=2.03, and the half angle of view is ω=44.0°.

Also in the projection lens 15 of this reference example, it is preferable that the conditions (1) to (7) are satisfied.

The following (Table 4) shows the values of the above-described conditions regarding the projection lens 15 of this reference example.

TABLE 4

| | | |
|---|---|---|
| t12/f = 6.5 | t34/f = 3.0 | |
| t34/d = 1.9 | (t34 + d)/f = 4.6 | |
| f1/f = −2.2 | f2/f = 8.4 | f3/f = 6.6 |

Figure 8:
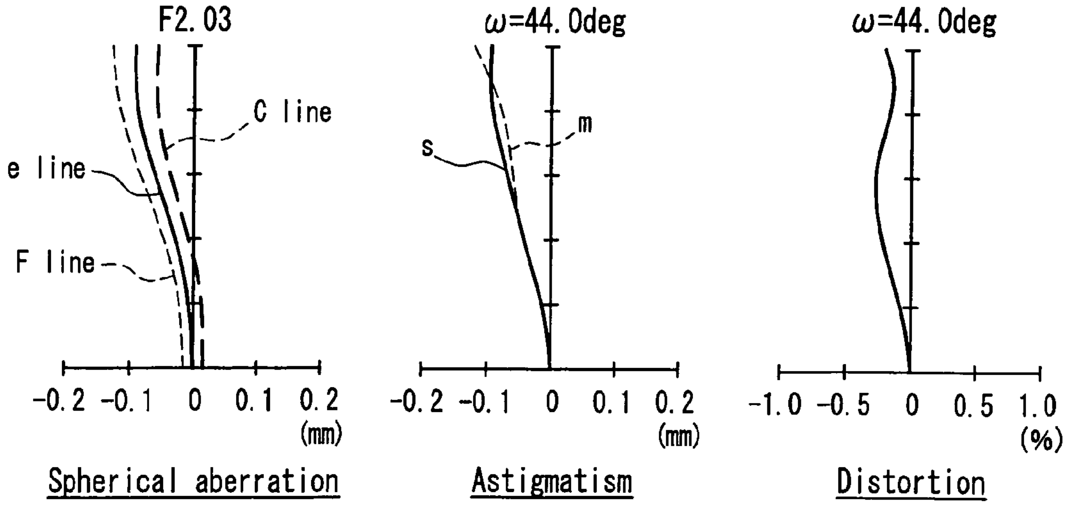
FIG. 8 shows aberration performance charts (spherical aberration, astigmatism, distortion) of the projection lens of Reference Example 2.

FIG. 8 shows aberration performance charts (spherical aberration, astigmatism, distortion) of the projection lens 15 shown in FIG. 7.

As is clear from the aberration performance charts shown in FIG. 8, it is seen that in the projection lens 15 of this reference example, the aberrations were corrected sufficiently by satisfying the various conditions described above, and thus good imaging performance was achieved.

REFERENCE EXAMPLE 3

Figure 9:
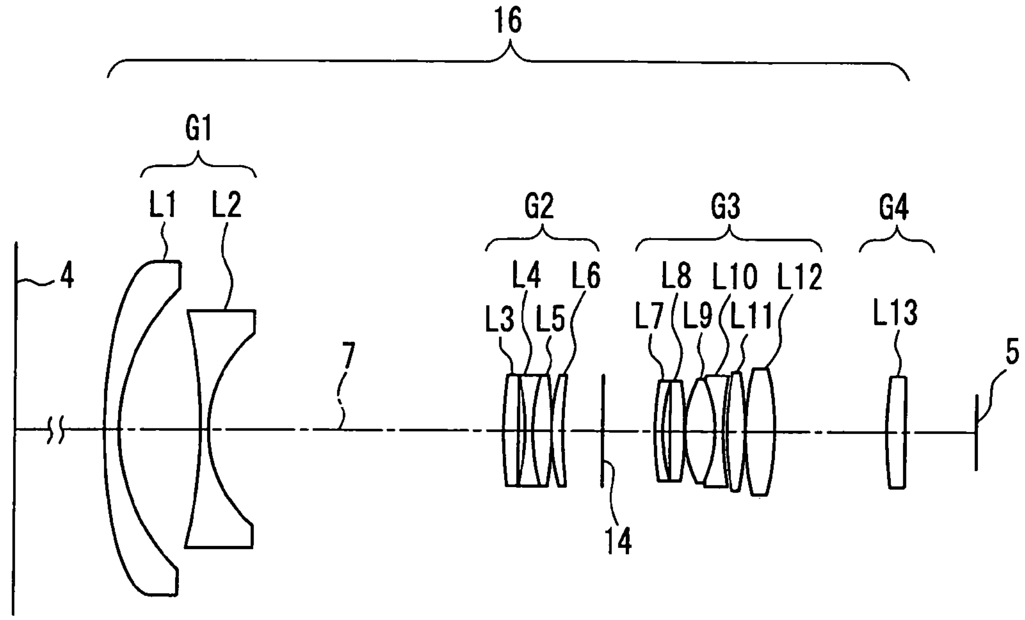
FIG. 9 is a layout drawing showing a configuration of a projection lens of Reference Example 3.

FIG. 9 is a layout drawing showing a configuration of a projection lens of Reference Example 3. A projection lens 16 of this reference example is the same as the projection lens 13 of Reference Example 1 with regard to the basic configuration from the first lens group G1 to the fourth lens group G4 and the positional relationship between the optical axis 7 and the image plane 5.

The projection lens 16 of this reference example is different from the projection lens 13 of Reference Example 1 in the power distribution and the parameters such as the surface spacing of the lenses constituting the first lens group G1, the second lens group G2, the third lens group G3, and the fourth lens group G4.

The following (Table 5) shows specific numerical examples for the lenses of the projection lens 16 shown in FIG. 9.

TABLE 5

| Lens | i-th surface | ri | di | ni | νi |
|---|---|---|---|---|---|
| L1 | 1 | 87.736 | 4.031 | 1.49015 | 57.2 |
| | 2 | 33.259 | 24.328 | | |
| L2 | 3 | −166.115 | 2.121 | 1.58913 | 61.3 |
| | 4 | 27.934 | 79.551 | | |
| L3 | 5 | 103.945 | 3.500 | 1.62004 | 36.3 |
| | 6 | −238.804 | 1.909 | | |
| L4 | 7 | −50.052 | 1.591 | 1.62041 | 60.3 |
| L5 | 8 | 38.521 | 5.303 | 1.62588 | 35.7 |
| | 9 | −100.075 | 0.318 | | |
| L6 | 10 | 38.581 | 3.712 | 1.62004 | 36.3 |
| | 11 | 81.37 | 6.894 | | |
| | 12 | Infinity | 12.384 | | |
| L7 | 13 | 127.741 | 1.591 | 1.80609 | 33.3 |
| | 14 | 40.904 | 2.121 | | |
| L8 | 15 | 516.734 | 4.243 | 1.48749 | 70.4 |
| | 16 | −61.259 | 0.318 | | |
| L9 | 17 | 46.095 | 7.955 | 1.49700 | 81.6 |
| L10 | 18 | −30.355 | 1.591 | 1.80609 | 33.3 |
| | 19 | 59.458 | 1.273 | | |
| L11 | 20 | 90.637 | 4.561 | 1.51680 | 64.2 |
| | 21 | −82.510 | 0.318 | | |
| L12 | 22 | 58.084 | 8.167 | 1.49700 | 81.6 |
| | 23 | −55.249 | 33.000 | | |
| L13 | 24 | 80.00 | 5.300 | 1.83400 | 37.3 |
| | 25 | Infinity | 17.630 | | |

(Aspherical surface data)

| Lens | i-th surface | cc | A4 | A6 | A8 | A10 |
|---|---|---|---|---|---|---|
| L1 | 1 | −25.88879 | 3.43305E−06 | −3.13137E−10 | −1.31401E−13 | 1.13297E−16 |
| | 2 | −0.60968 | −3.86345E−06 | 5.67433E−09 | −5.23038E−12 | 9.62579E−16 |

Moreover, the focal length of the entire system is f=11.181 mm, the F number is F no.=2.02, the half angle of view is ω=43.5°.

Also in the projection lens 16 of this reference example, it is preferable that the conditions (1) to (7) are satisfied.

The following (Table 6) shows the values of the above-described condition regarding the projection lens 16 of this reference example.

TABLE 6

| | | |
|---|---|---|
| t12/f = 7.1 | t34/f = 2.9 | |
| t34/d = 1.9 | (t34 + d)/f = 4.5 | |
| f1/f = −2.3 | f2/f = 7.7 | f3/f = 6.2 |

Figure 10:
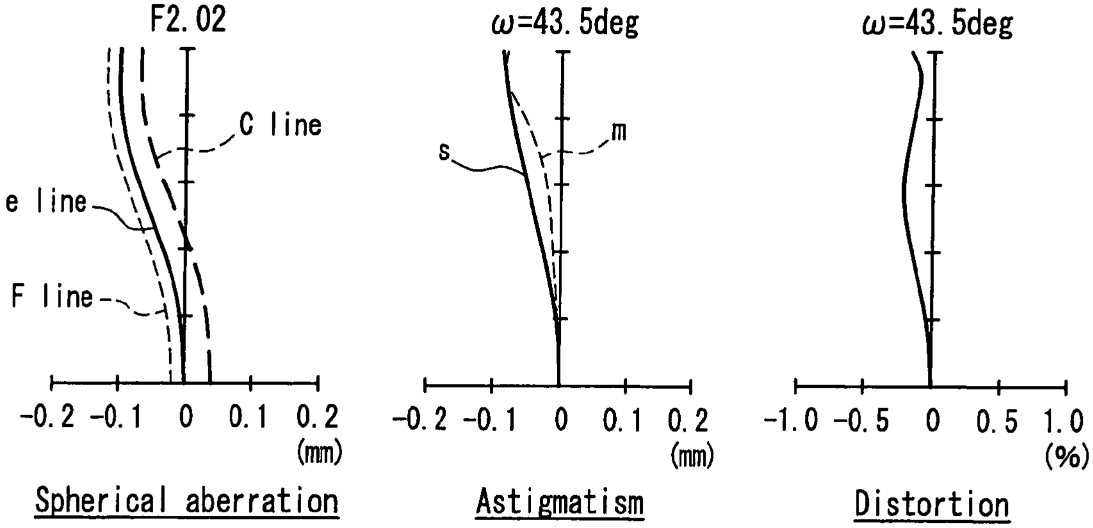
FIG. 10 shows aberration performance charts (spherical aberration, astigmatism, distortion) of the projection lens of Reference Example 3.

FIG. 10 shows aberration performance charts (spherical aberration, astigmatism, distortion) of the projection lens 16 shown in FIG. 9.

As is clear from the aberration performance charts shown in FIG. 10, it is seen that in the projection lens 16 of this reference example, the aberrations were corrected sufficiently by satisfying the various conditions described above, and thus good imaging performance was achieved.

REFERENCE EXAMPLE 4

Figure 11:
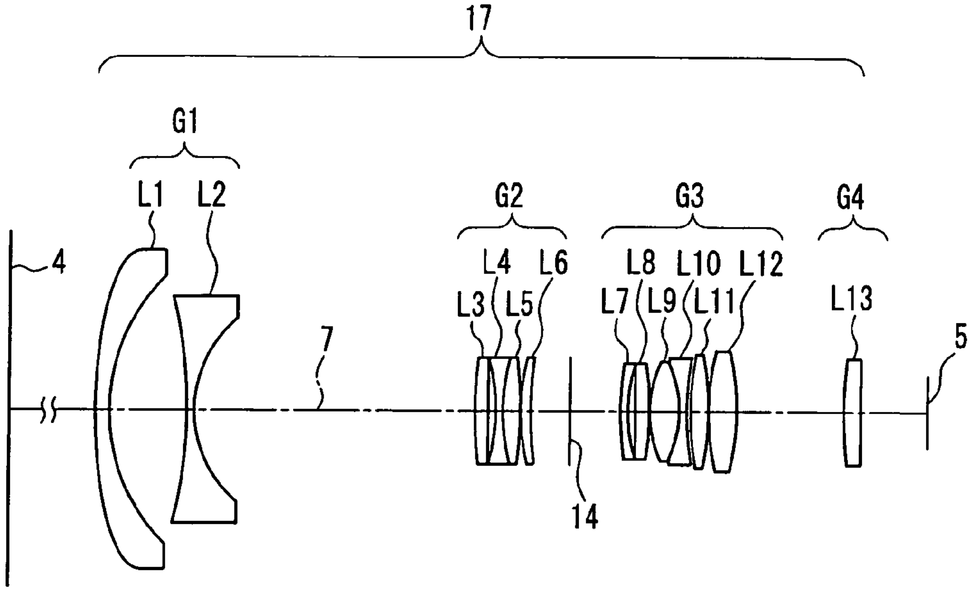
FIG. 11 is a layout drawing showing a configuration of a projection lens of Reference Example 4.

FIG. 11 is a layout drawing showing a configuration of a projection lens of Reference Example 4. A projection lens 17 of this reference example is the same as the projection lens 13 of Reference Example 1 with regard to the basic configuration from the first lens group G1 to the fourth lens group G4 and the positional relationship between the optical axis 7 and the image plane 5.

The projection lens 17 of this reference example is different from the projection lens 13 of Reference Example 1 in the power distribution and the parameters such as the surface spacing of the lenses constituting the first lens group G1, the second lens group G2, the third lens group G3, and the fourth lens group G4.

The following (Table 7) shows specific numerical examples for the lenses of the projection lens 17 shown in FIG. 11.

Figure 12:
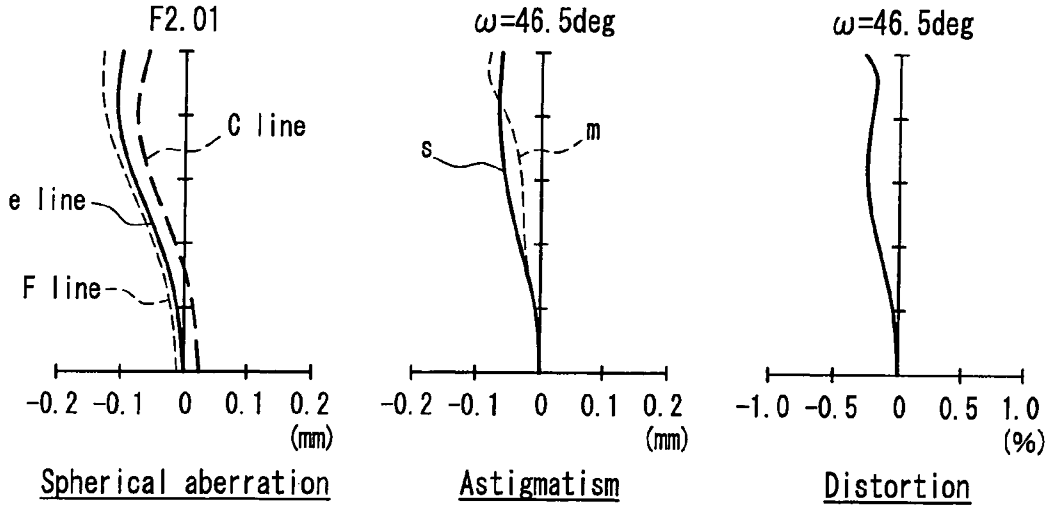
FIG. 12 shows aberration performance charts (spherical aberration, astigmatism, distortion) of the projection lens of Reference Example 4.

As is clear from the aberration performance charts shown in FIG. 12, it is seen that in the projection lens 17 of this reference example, the aberrations were corrected sufficiently by satisfying the various conditions described above, and thus good imaging performance was achieved.

TABLE 7

| Lens | i-th surface | ri | di | ni | νi |
|---|---|---|---|---|---|
| L1 | 1 | 137.548 | 3.800 | 1.49015 | 57.2 |
| | 2 | 32.902 | 23.330 | | |
| L2 | 3 | −141.738 | 2.000 | 1.58913 | 61.3 |
| | 4 | 28.227 | 75.096 | | |
| L3 | 5 | 83.999 | 3.300 | 1.62004 | 36.3 |
| | 6 | −288.161 | 1.800 | | |
| L4 | 7 | −41.991 | 1.500 | 1.62041 | 60.3 |
| L5 | 8 | 25.645 | 5.000 | 1.62588 | 35.7 |
| | 9 | −105.810 | 0.300 | | |
| L6 | 10 | 35.985 | 3.500 | 1.62004 | 36.3 |
| | 11 | 82.49 | 6.386 | | |
| | 12 | Infinity | 10.737 | | |
| L7 | 13 | 149.645 | 1.500 | 1.80609 | 33.3 |
| | 14 | 39.126 | 2.000 | | |
| L8 | 15 | 313.632 | 4.000 | 1.48749 | 70.4 |
| | 16 | −53.406 | 0.300 | | |
| L9 | 17 | 44.978 | 7.500 | 1.49700 | 81.6 |
| L10 | 18 | −26.070 | 1.500 | 1.80609 | 33.3 |
| | 19 | 57.753 | 1.200 | | |
| L11 | 20 | 86.958 | 4.300 | 1.51680 | 64.2 |
| | 21 | −64.325 | 0.300 | | |
| L12 | 22 | 57.715 | 7.700 | 1.49700 | 81.6 |
| | 23 | −46.579 | 31.000 | | |
| L13 | 24 | 75.50 | 5.000 | 1.83400 | 37.3 |
| | 25 | Infinity | 16.400 | | |

(Aspherical surface data)

| Lens | i-th surface | cc | A4 | A6 | A8 | A10 |
|---|---|---|---|---|---|---|
| L1 | 1 | −91.88655 | 3.78951E−06 | −5.39148E−10 | −1.49128E−13 | 1.34374E−16 |
| | 2 | −0.60615 | −4.49233E−06 | 8.10351E−09 | −7.81770E−12 | 1.64759E−15 |

Moreover, the focal length of the entire system is f=9.495 mm, the F number is F no.=2.01, and the half angle of view is ω=46.5°.

Also in the projection lens 17 of this reference example, it is preferable that the conditions (1) to (7) are satisfied.

The following (Table 8) shows the values of the above-described conditions regarding the projection lens 17 of this reference example.

TABLE 8

| | | |
|---|---|---|
| t12/f = 7.9 | t34/f = 3.3 | |
| t34/d = 1.9 | (t34 + d)/f = 5.0 | |
| f1/f = −2.4 | f2/f = 9.3 | f3/f = 6.2 |

FIG. 12 shows aberration performance charts (spherical aberration, astigmatism, distortion) of the projection lens 17 shown in FIG. 11.

First Embodiment

Figure 13:
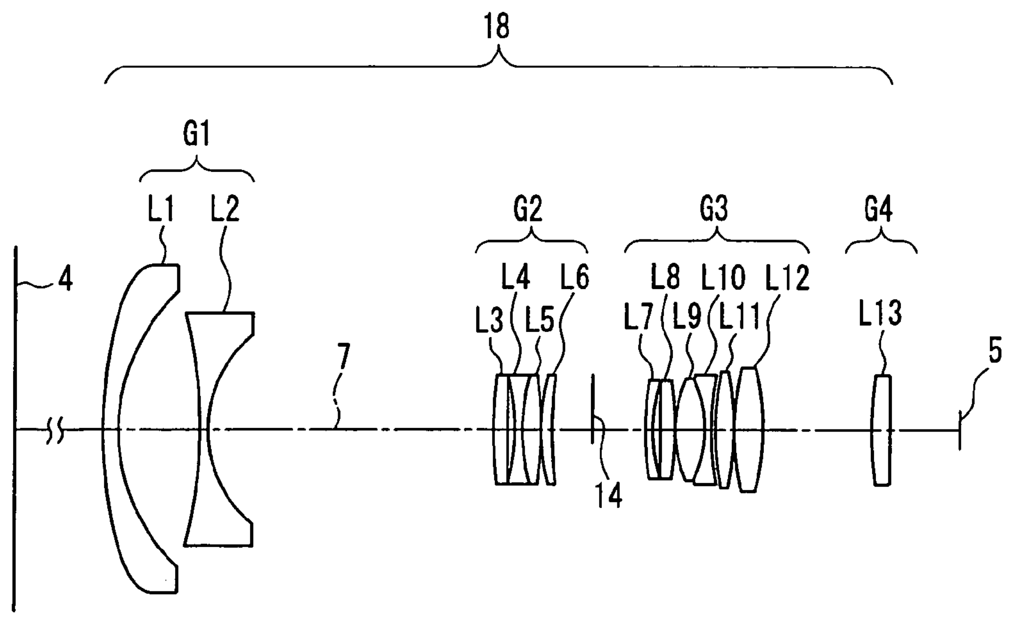
FIG. 13 is a layout drawing showing a configuration of a projection lens according to a first embodiment of the present invention.

FIG. 13 is a layout drawing showing a configuration of a projection lens according to the first embodiment of the present invention. A projection lens 18 of this embodiment is the same as the projection lens 13 of Reference Example 1 with regard to the basic configuration from the first lens group G1 to the fourth lens group G4 and the positional relationship between the optical axis 7 and the image plane 5.

The projection lens 18 of this embodiment is different from the projection lens 13 of Reference Example 1 in the power distribution and the parameters such as the surface spacing of the lenses constituting the first lens group G1, the second lens group G2, the third lens group G3, and the fourth lens group G4, and that an opening of the aperture stop 14 is eccentric with respect to the optical axis 7 common to the first to fourth lens groups G1 to G4.

The following (Table 9) shows specific numerical examples for the lenses of the projection lens 18 shown in FIG. 13.

TABLE 9

| Lens | i-th surface | ri | Di | ni | νi |
|---|---|---|---|---|---|
| L1 | 1 | 91.906 | 3.800 | 1.49015 | 57.2 |
| | 2 | 29.766 | 23.277 | | |
| L2 | 3 | −147.847 | 2.000 | 1.58913 | 61.3 |
| | 4 | 27.081 | 77.284 | | |
| L3 | 5 | 82.032 | 3.600 | 1.80609 | 33.3 |
| | 6 | −616.766 | 1.800 | | |
| L4 | 7 | −53.084 | 1.500 | 1.69680 | 55.5 |
| L5 | 8 | 35.819 | 5.000 | 1.64769 | 33.8 |
| | 9 | −103.750 | 0.300 | | |
| L6 | 10 | 33.752 | 3.500 | 1.62004 | 36.3 |
| | 11 | 51.33 | 5.500 | | |
| | 12 | Infinity | 13.728 | | |
| L7 | 13 | 90.906 | 1.500 | 1.80609 | 33.3 |
| | 14 | 40.773 | 2.000 | | |
| L8 | 15 | 198.916 | 4.000 | 1.48749 | 70.4 |
| | 16 | −53.079 | 0.300 | | |
| L9 | 17 | 49.859 | 7.500 | 1.49700 | 81.6 |
| L10 | 18 | −26.986 | 1.500 | 1.80609 | 33.3 |
| | 19 | 62.530 | 1.000 | | |
| L11 | 20 | 81.403 | 4.800 | 1.48749 | 70.4 |
| | 21 | −90.228 | 0.300 | | |
| L12 | 22 | 64.245 | 7.700 | 1.49700 | 81.6 |
| | 23 | −46.511 | 31.000 | | |
| L13 | 24 | 75.50 | 5.000 | 1.83400 | 37.3 |
| | 25 | Infinity | 15.480 | | |

(Aspherical surface data)

| Lens | i-th surface | cc | A4 | A6 | A8 | A10 |
|---|---|---|---|---|---|---|
| L1 | 1 | −41.15915 | 3.78951E−06 | −5.39148E−10 | −1.49128E−13 | 1.34374E−16 |
| | 2 | −0.81960 | −4.49233E−06 | 8.10351E−09 | −7.81770E−12 | 1.64759E−15 |

Moreover, the focal length of the entire system is f=9.674 mm, the F number is F no.=2.01, and the half angle of view is ω=46.0°.

Figure 14:
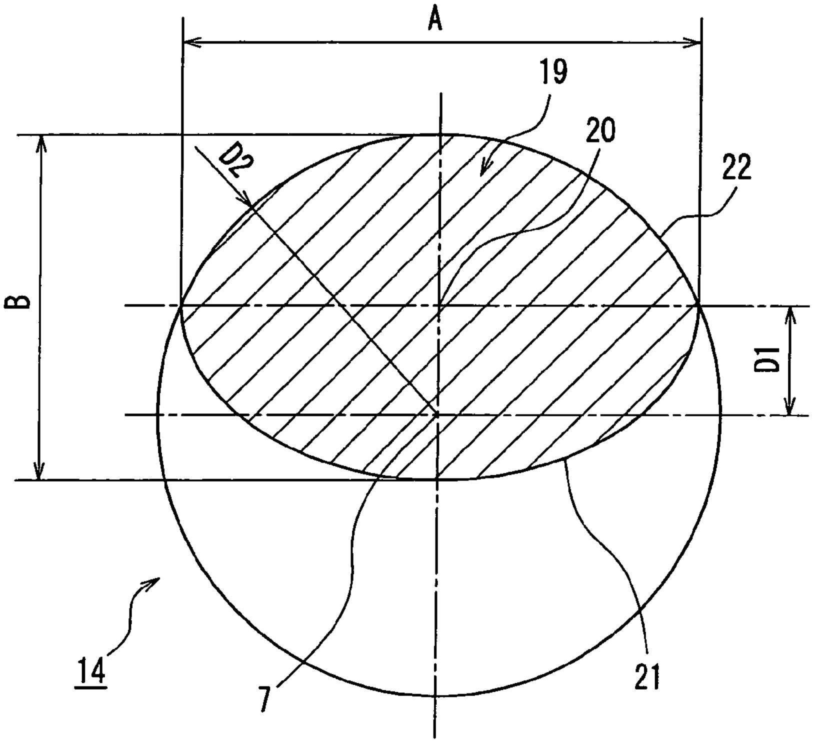
FIG. 14 is a schematic diagram showing an aperture stop used in the projection lens according to the first embodiment of the present invention, taken from an optical axis direction.

Hereinafter, a specific shape of the aperture stop 14 will be described with reference to FIG. 14. FIG. 14 is a schematic diagram showing the aperture stop used in the projection lens according to the first embodiment of the present invention, taken from the optical axis direction.

In FIG. 14, D1 indicates the amount of eccentricity of the aperture stop 15, and D2 indicates the effective aperture radius in the position of the aperture stop 14. As shown in FIG. 14, the opening 19 of the aperture stop 14 is a hatched substantially elliptical area (hereinafter, also referred to as the "elliptical opening") that is surrounded by a circular outer circumferential portion 22 having a radius D2 and a half ellipse 21. The half ellipse 21 is one of two equal parts into which an ellipse defined by a long axis A and a short axis B (direction of eccentricity) is divided by the long axis A, and the center 20 of the half ellipse 21 is made eccentric with respect to the optical axis 7 of the projection lens 18 by an amount D1.

In this manner, in the projection lens 18 of this embodiment, the aperture stop 14 is eccentric, so that if the aperture stop 14 rotates during focus adjustment, then the imaging performance for each angle of view also rotates according to the aperture stop 14. Therefore, in the projection lens 18 of this embodiment, focus adjustment is performed in a manner that the aperture stop 14 is prevented from rotating with respect to the optical axis 7. More specifically, the aperture stop 14 is fixed to the second lens group G2 or the third lens group G3, which serves as the rear lens group, and focus adjustment is performed by moving the second and third lens groups G2 and G3 serving as the rear lens group in the direction of the optical axis 7 without rotating those lens groups.

The amount of eccentricity D1 of the aperture stop 14 can be set appropriately giving consideration to the arrangement of optical components for illumination, the incident angle of illumination light, brightness, aberration performance, and the like.

In this embodiment, the long axis A=20.8 mm, the short axis B=12.6 mm, the amount of eccentricity D1 of the aperture stop 14=5.4 mm, and the effective aperture radius D2 in the position of the aperture stop 14=11.7 mm.

The F number (F no.=2.01) in this embodiment is a value that is obtained when the entire area of the circular outer circumferential portion 22 shown in FIG. 14 is taken into account, and indicates the maximum light-collecting range that can be allowed by the projection lens 18. Therefore, the effective F number for the opening 19 of the eccentric aperture stop 14 is about 3.0.

Also in the projection lens 18 of this embodiment, it is preferable that the conditions (1) to (7) are satisfied, and it is further preferable in the projection lens 18 of this embodiment that the following condition is satisfied:

$$D1/D2<0.5 \quad (12)$$

The formula (12) is the condition for determining an optimum amount of eccentricity for the aperture stop 14. If the upper limit of the formula (12) is exceeded, then the amount of eccentricity of the aperture stop 14 is too large, resulting in a considerable loss of symmetry with respect to the optical axis 7, and thus the asymmetry of the imaging performance disadvantageously becomes significant, which is not desirable. Moreover, if the upper limit of the formula (12) is exceeded, then the ratio of the opening 19 to the entire area of the circular outer circumferential portion 22 in the aperture stop 14 is reduced. This means that an actually available range relative to the maximum light-collecting range that can be allowed by the performance of the projection lens 18 is reduced, and thus a wasted area in the aperture stop 14 is increased.

It should be noted that magnification adjustment is performed by moving the first lens group G1 serving as the front lens group in the direction of the optical axis 7. Since the present lens is not a zoom lens, "magnification adjustment", as used herein, refers to correcting a change in the magnification due to focus adjustment, and this applies to the following description.

The following (Table 10) shows the values of the above-described conditions regarding the projection lens 18 of this embodiment.

TABLE 10

| | | |
|---|---|---|
| t12/f = 8.0 | t34/f = 3.2 | |
| t34/d = 2.0 | (t34 + d)/f = 4.8 | |
| f1/f = −2.4 | f2/f = 10.3 | f3/f = 6.0 |
| D1/D2 = 0.46 | | |

Figure 15:
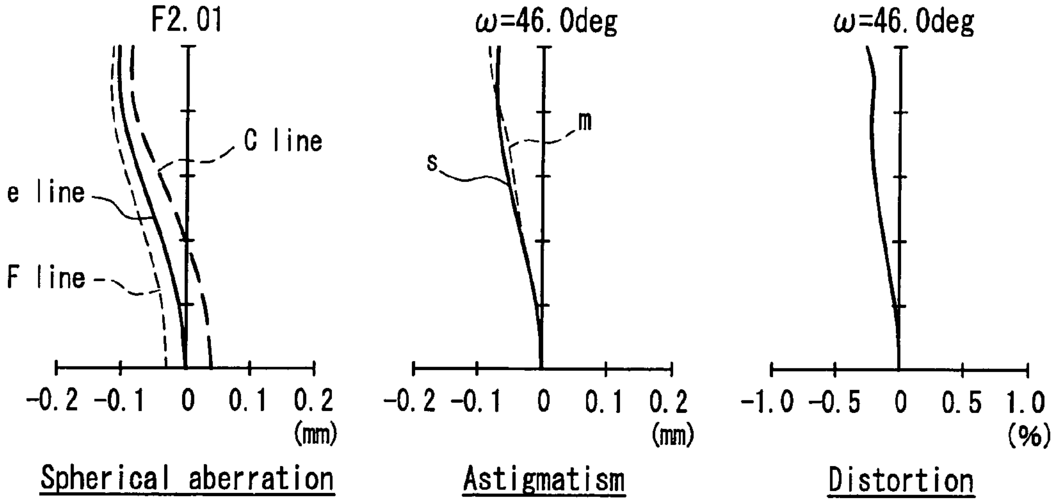
FIG. 15 shows aberration performance charts (spherical aberration, astigmatism, distortion) of the projection lens according to the first embodiment of the present invention.

FIG. 15 shows aberration performance charts (spherical aberration, astigmatism, distortion) of the projection lens 18 shown in FIG. 13. The aberration performance shown here is an aberration performance that can be obtained when the entire area of the circular outer circumferential portion 22 is considered as the aperture stop. In the case of an elliptical opening, a part of the circular outer circumferential portion is used, so that if the aberrations have been corrected sufficiently with respect to the entire area of the circular outer circumferential portion 22, then good imaging performance can be achieved even with the elliptical opening.

As is clear from the aberration performance charts shown in FIG. 15, it is seen that in the projection lens 18 of this embodiment, the aberrations were corrected sufficiently by satisfying the various conditions described above, and thus good imaging performance was achieved. Therefore, also within the range of the amount of eccentricity defined by the (formula 12), the projection lens 18 of this embodiment shows good imaging performance without any loss of symmetry.

According to the configuration of the projection lens 18 of this embodiment described above, it is possible to provide a projection lens that shows good aberration performance even under bright conditions in which the F number is about 2.0 and can realize specifications required for a projection display apparatus, such as a wide angle, a long back focus, and a high relative illumination, with a rational configuration. In particular, by adopting a configuration in which "the aperture stop 14 is made eccentric", interference between the projection lens 18 and other optical components (e.g., a mirror for illumination) can be prevented without employing offset projection, and it is therefore possible especially to perform right projection using a reflective spatial light modulator such as a DMD.

Hereinafter, the present invention will be described more specifically by means of additional embodiments of the projection lens having a configuration in which the aperture stop is made eccentric (second to fourth embodiments).

Second Embodiment

Figure 16:
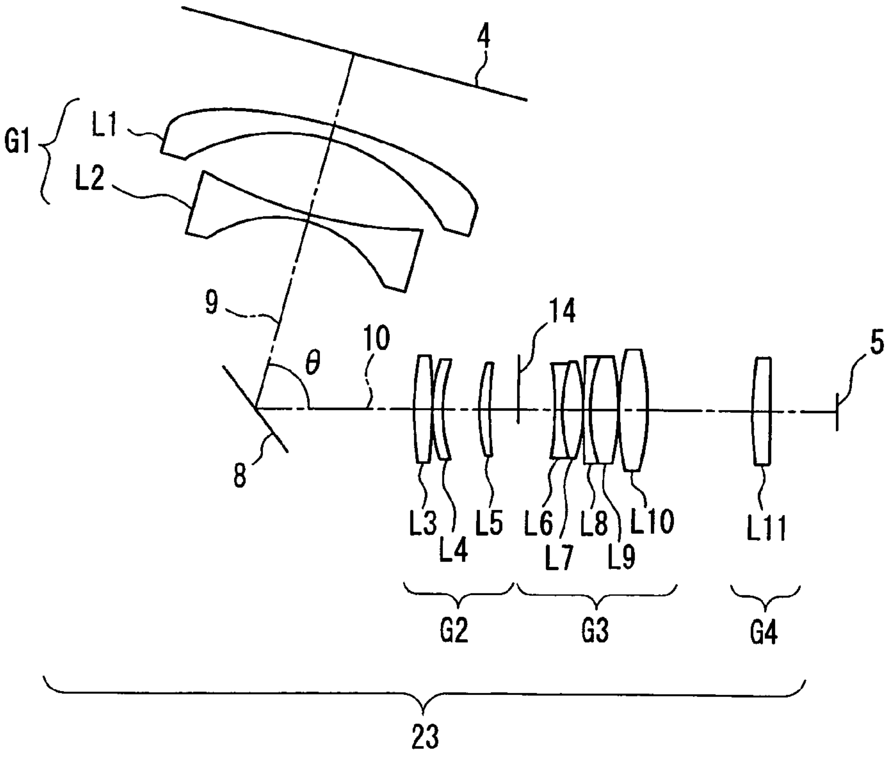
FIG. 16 is a layout drawing showing a configuration of a projection lens according to a second embodiment of the present invention.

FIG. 16 is a layout drawing showing a configuration of a projection lens according to the second embodiment of the present invention.

As shown in FIG. 16, a projection lens 23 of this embodiment is constituted by a first lens group G1 having a negative power and composed of two lenses L1 and L2, which serves as the front lens group, a second lens group G2 having a positive power and composed of three lenses L3, L4, and L5, which serves as the rear lens group, a third lens group G3 having a positive power and composed of five lenses L6, L7, L8, L9, and L10, which also serves as the rear lens group, and a fourth lens group G4 having a positive power and composed of a single lens L11, which serves as the auxiliary lens group, that are arranged in this order from the screen 4 side toward the image plane 5 side.

A plane mirror 8 serving as the optical path bending means is disposed between the first lens group G1 and the second lens group G2. When the angle between optical axes 9 and 10 upstream and downstream of the plane mirror 8 is θ, it is preferable that the following relationship is satisfied:

$$45° \leqq \theta \leqq 90° \tag{13}$$

If the upper limit of the formula (13) is exceeded, then a spacing between the first lens group G1 and the second lens group G2 that is required to bend the optical path is increased, so that the overall length of the projection lens 23 is increased, resulting in an increase in the size of the projection lens 23 and a decrease in the peripheral light quantity. If the lower limit of the formula (13) is exceeded, then an effective reflecting area that is required for the plane mirror 8 is increased, resulting in an increase in the size of the plane mirror 8.

In this embodiment, θ=70°.

As the plane mirror 8, a plane mirror having a reflectivity as high as possible preferably is used. A low reflectivity causes a large quantity of unwanted light inside a lens barrel of the projection lens 23, resulting in the occurrence of flare and a decrease in the contrast. Thus, as the plane mirror 8, for example, a dielectric multilayer mirror in which a dielectric multilayer is evaporated onto the reflecting surface thereof is preferably used. The dielectric multilayer mirror has a high reflectivity, and thus the occurrence of unwanted light inside the lens barrel can be suppressed by using the dielectric multilayer mirror.

The aperture stop 14 is disposed between the second lens group G2 and the third lens group G3, and has an opening that is eccentric with respect to the optical axes 9 and 10 common to the front lens group and the rear lens group that are located upstream and downstream of the plane mirror 8. The specific opening shape and amount of eccentricity of the aperture stop 14 can be set appropriately in the same manner as described in the first embodiment, and in this embodiment, the long axis A=17.0 mm, the short axis B=12.0 mm, the amount of eccentricity D1 of the aperture stop 14=3.0 mm, the effective aperture radius D2 in the position of the aperture stop 14=9.0 mm (see FIG. 14).

In the projection lens 23 of this embodiment, the first to fourth lens groups G1 to G4 and the image plane 5 are arranged such that the optical axes 9 and 10 common to the first to fourth lens groups G1 to G4 pass through the center of the image plane 5, and thus it is possible to perform right projection of an optical image formed on the spatial light modulator onto the screen 4.

The following (Table 11) shows specific numerical examples for the lenses of the projection lens 23 shown in FIG. 16.

TABLE 11

| Lens | i-th surface | Ri | di | ni | νi |
|---|---|---|---|---|---|
| L1 | 1 | 403.546 | 3.700 | 1.49015 | 57.2 |
| | 2 | 36.117 | 16.389 | | |
| L2 | 3 | −193.196 | 2.000 | 1.71300 | 53.9 |
| | 4 | 20.074 | 40.000 | | |
| | 5 | Infinity | 25.000 | | |
| L3 | 6 | 58.596 | 3.100 | 1.80517 | 25.5 |
| | 7 | −657.064 | 0.300 | | |
| L4 | 8 | 31.487 | 1.700 | 1.71300 | 53.9 |
| | 9 | 20.668 | 10.041 | | |
| L5 | 10 | 22.355 | 2.500 | 1.62004 | 36.3 |
| | 11 | 46.72 | 6.500 | | |
| | 12 | Infinity | 8.346 | | |
| L6 | 13 | −66.952 | 1.500 | 1.83400 | 33.3 |
| L7 | 14 | 25.832 | 5.000 | 1.48749 | 70.4 |
| | 15 | −42.734 | 0.300 | | |
| L8 | 16 | 96.259 | 1.500 | 1.80517 | 25.5 |
| L9 | 17 | 24.575 | 6.000 | 1.51680 | 64.2 |
| | 18 | −62.896 | 0.300 | | |
| L10 | 19 | 34.931 | 6.000 | 1.49700 | 81.6 |
| | 20 | −52.426 | 25.000 | | |
| L11 | 21 | 65.000 | 3.800 | 1.83400 | 33.3 |
| | 22 | Infinity | 10.485 | | |

(Aspherical surface data)

| Lens | i-th surface | cc | A4 | A6 | A8 | A10 |
|---|---|---|---|---|---|---|
| L1 | 1 | 0.00000 | 1.47367E−05 | −9.66061E−09 | 3.50758E−12 | 1.01123E−15 |
| | 2 | −7.95748 | 2.47708E−05 | −1.08407E−08 | −1.84706E−11 | 9.07824E−15 |

Moreover, the focal length of the entire system is f=7.098 mm, the F number is F no.=2.03, and the half angle of view is ω=45.0°.

It should be noted that the effective F number for the opening of the eccentric aperture stop 14 is about 2.6.

Also in the projection lens 23 of this embodiment, it is preferable that the conditions (1) to (8) are satisfied.

The following (Table 12) shows the values of the above-described conditions regarding the projection lens 23 of this embodiment.

TABLE 12

| | | |
|---|---|---|
| t12/f = 9.2 | t34/f = 3.5 | |
| t34/d = 2.4 | (t34 + d)/f = 5.0 | |
| f1/f = −2.3 | f2/f = 7.7 | f3/f = 7.1 |
| D1/D2 = 0.33 | | |

Figure 17:
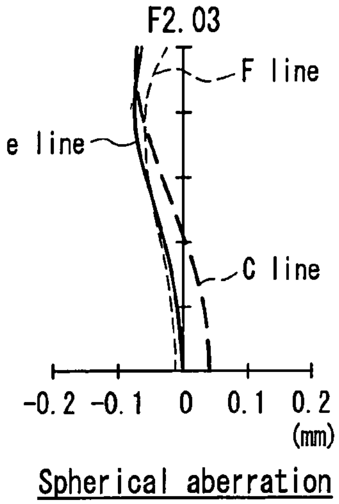
FIG. 17 shows aberration performance charts (spherical aberration, astigmatism, distortion) of the projection lens according to the second embodiment of the present invention.

FIG. 17 shows aberration performance charts (spherical aberration, astigmatism, distortion) of the projection lens 23 shown in FIG. 16.

As is clear from the aberration performance charts shown in FIG. 17, it is seen that in the projection lens 23 of this embodiment, the aberrations were corrected sufficiently by satisfying the various conditions described above, and thus good imaging performance was achieved.

According to the configuration of the projection lens 23 of this embodiment described above, it is possible to provide a projection lens that is especially suited for use in performing right projection using a reflective spatial light modulator such as a DMD, shows good aberration performance even under bright conditions in which the F number is about 2.0, and can realize specifications required for a projection display apparatus, such as a wide angle, a long back focus, and a high relative illumination, with a rational configuration.

Third Embodiment

Figure 18:
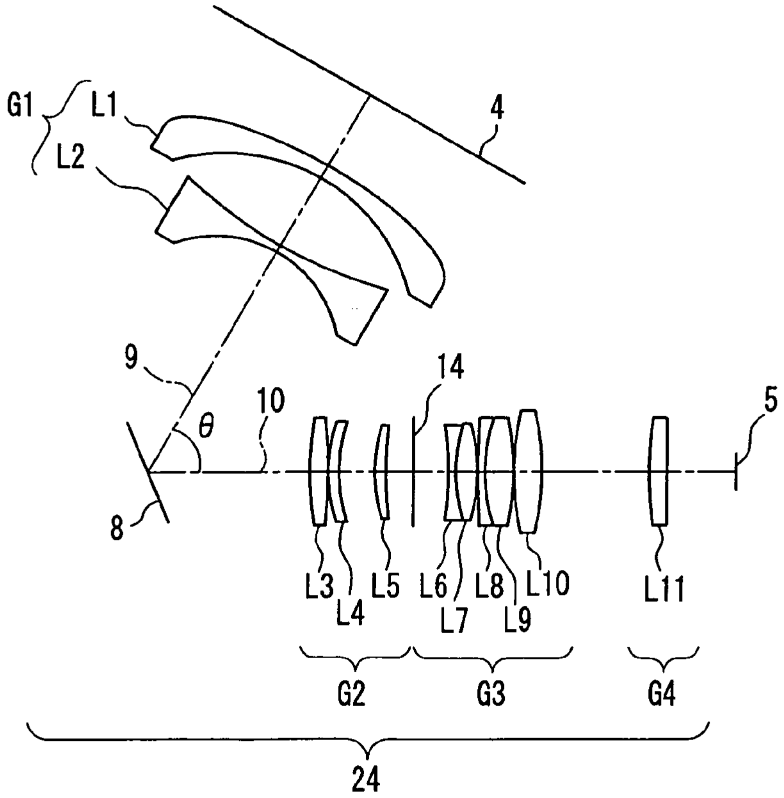
FIG. 18 is a layout drawing showing a configuration of a projection lens according to a third embodiment of the present invention.

FIG. 18 is a layout drawing showing a configuration of a projection lens according to the third embodiment of the present invention.

As shown in FIG. 18, the projection lens 24 of this embodiment is, as in the case of the projection lens 23 of the second embodiment, constituted by a first lens group G1 having a negative power and composed of two lenses L1 and L2, which serves as the front lens group, a second lens group G2 having a positive power and composed of three lenses L3, L4, and L5, which serves as the rear lens group, a third lens group G3 having a positive power and composed of five lenses L6, L7, L8, L9, and L10, which also serves as the rear lens group, and a fourth lens group G4 having a positive power and composed of a single lens L11, which serves as the auxiliary lens group, that are arranged in this order from the screen 4 side toward the image plane 5 side.

Moreover, as in the case of the projection lens 23 of the second embodiment, a plane mirror 8 serving as the optical path bending means is disposed between the first lens group G1 and the second lens group G2. The angle θ between optical axes 9 and 10 upstream and downstream of the plane mirror 8 can be set appropriately in the same manner as described in the second embodiment, and it is set that θ=60° in this embodiment.

A aperture stop 14 is disposed between the second lens group G2 and the third lens group G3, and has an opening that is eccentric with respect to the optical axes 9 and 10 common to the front lens group and the rear lens group that are located upstream and downstream of the plane mirror 8.

In this embodiment, the aperture stop 14 is eccentrically displaced in a direction perpendicular to a plane (the sheet surface) containing the optical axes 9 and 10 upstream and downstream of the plane mirror 8. That is to say, when the effective display area of a DMD serving as the spatial light modulator has a rectangular shape having a long axis and a short axis, the aperture stop 14 is displaced eccentrically in a direction along the long axis. The specific opening shape and amount of eccentricity of the aperture stop 14 can be set appropriately in the same manner as described in the first embodiment, and in this embodiment, the long axis A=15.3 mm, the short axis B=10.2 mm, the amount of eccentricity D1 of the aperture stop 14=3.2 mm, the effective aperture radius D2 in the position of the aperture stop 14=8.3 mm (see FIG. 14).

In the projection lens 24 of this embodiment, the first to fourth lens groups G1 to G4 and the image plane 5 are arranged such that the optical axes 9 and 10 common to the first to fourth lens groups G1 to G4 pass through the center of the image plane 5, and thus it is possible to perform right projection of an optical image formed on the spatial light modulator onto the screen 4.

Hereinafter, the lens configuration of the projection lens 24 of this embodiment will be described more specifically.

The first lens group G1 is composed of the negative meniscus lens L1 whose convex surface faces the screen 4 side, and the negative lens L2 that are arranged in this order from the screen 4 side, and has a negative refractive power as a whole. Both surfaces of the negative meniscus lens L1 are aspherical. By disposing the aspherical surface in a position that is the closest to the screen 4 in the first lens group G1 and where the height of off-axis rays is the highest, a large distortion that occurs in the first lens group G1 can be corrected, and also the balance of the off-axis aberrations can be controlled appropriately.

The second lens group G2 is composed of the positive lens L3, the negative meniscus lens L4 whose convex surface faces the screen 4 side, and the positive meniscus lens L5 whose convex surface faces the screen 4 side that are arranged in this order from the screen 4 side, and has a positive refractive power as a whole.

The third lens group G3 is composed of a first cemented lens of the negative lens L6 and the positive lens L7, a second cemented lens of the negative lens L8 and the positive lens L9, and the positive lens L10 that are arranged in this order from the screen 4 side, and has a positive refractive power as a whole.

The positive lens L10 disposed in a position closest to the image plane 5 (the spatial light modulator) in the third lens group G3 is made of anomalous dispersion glass. By employing the anomalous dispersion glass in this portion, the off-axis chromatic aberration, which cannot be completely corrected by the cemented lenses, can be corrected.

The fourth lens group G4 is composed of the single plano-convex lens L11 whose convex surface faces the screen 4 side, and has a positive refractive power.

The following (Table 13) shows specific numerical examples for the lenses of the projection lens 24 shown in FIG. 18.

TABLE 13

| Lens | i-th surface | ri | di | ni | vi |
|---|---|---|---|---|---|
| L1 | 1 | 82.588 | 3.500 | 1.49015 | 57.2 |
| | 2 | 26.848 | 17.300 | | |
| L2 | 3 | −551.850 | 2.000 | 1.71300 | 53.9 |
| | 4 | 19.760 | 38.000 | | |
| | 5 | Infinity | 20.000 | | |
| L3 | 6 | 42.880 | 3.200 | 1.80517 | 25.5 |
| | 7 | −5270.000 | 0.300 | | |
| L4 | 8 | 31.933 | 1.500 | 1.71300 | 53.9 |
| | 9 | 18.141 | 10.100 | | |
| L5 | 10 | 21.577 | 3.000 | 1.64769 | 33.8 |
| | 11 | 36.52 | 5.500 | | |
| | 12 | Infinity | 8.600 | | |
| L6 | 13 | −91.500 | 1.500 | 1.83400 | 33.3 |
| L7 | 14 | 26.351 | 5.500 | 1.48749 | 70.4 |
| | 15 | −44.091 | 0.300 | | |
| L8 | 16 | 112.115 | 1.500 | 1.80517 | 25.5 |
| L9 | 17 | 24.690 | 6.500 | 1.51680 | 64.2 |
| | 18 | −56.750 | 0.300 | | |
| L10 | 19 | 34.910 | 6.500 | 1.49700 | 81.6 |
| | 20 | −46.965 | 22.000 | | |
| L11 | 21 | 65.000 | 3.800 | 1.83400 | 33.3 |
| | 22 | Infinity | 12.500 | | |

(Aspherical surface data)

| Lens | i-th surface | cc | A4 | A6 | A8 | A10 |
|---|---|---|---|---|---|---|
| L1 | 1 | −8.44121 | 8.58356E−06 | −6.56373E−10 | −2.58456E−12 | 3.17977E−15 |
| | 2 | −3.87040 | 2.22619E−05 | −1.56617E−08 | 9.58095E−12 | −1.54987E−14 |

Moreover, the focal length of the entire system is f=7.104 mm, the F number is F no.=2.02, and the half angle of view is ω=45.0°.

It should be noted that the effective F number for the opening of the eccentric aperture stop 14 is about 2.7.

Also in the projection lens 24 of this embodiment, it is preferable that the condition (1) to (8) are satisfied.

The following (Table 14) shows the values of the above-described condition regarding the projection lens 24 of this embodiment.

TABLE 14

| | | |
|---|---|---|
| t12/f = 8.2 | t34/f = 3.1 | |
| t34/d = 1.8 | (t34 + d)/f = 4.9 | |
| f1/f = −2.4 | f2/f = 8.8 | f3/f = 6.1 |
| D1/D2 = 0.39 | | |

Figure 19:
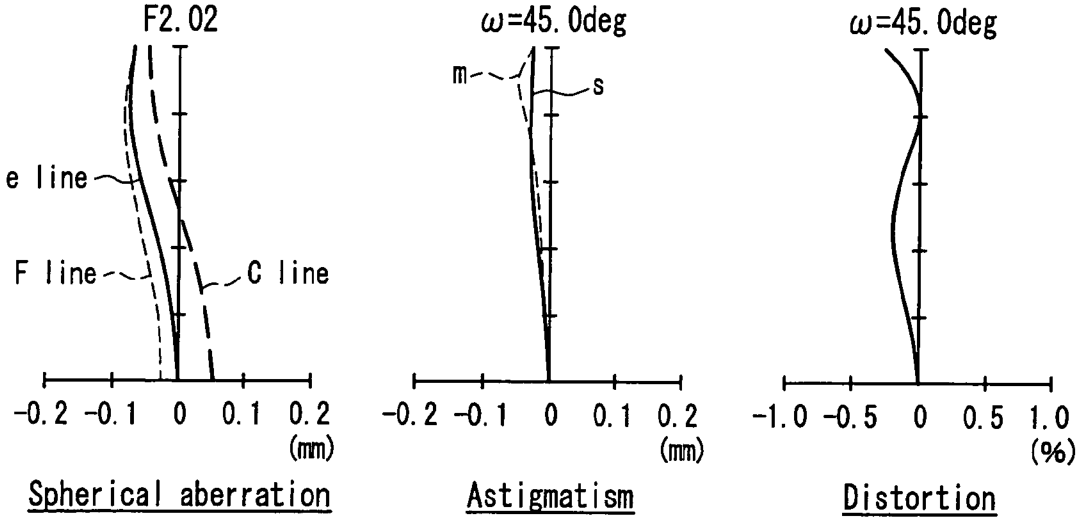
FIG. 19 shows aberration performance charts (spherical aberration, astigmatism, distortion) of the projection lens according to the third embodiment of the present invention.

FIG. 19 shows aberration performance charts (spherical aberration, astigmatism, distortion) of the projection lens 24 shown in FIG. 18.

As is clear from the aberration performance charts shown in FIG. 19, it is seen that in the projection lens 24 of this embodiment, the aberrations were corrected sufficiently by satisfying the various conditions described above, and thus good imaging performance was achieved.

In the projection lens 24 of this embodiment, when the Abbe number and the refractive index of the positive lens L7 constituting the cemented lens included in the third lens group G3 are respectively ν3p and n3p, and the Abbe number and the refractive index of the negative lens L6 constituting the cemented lens included in the third lens group G3 are respectively ν3n and n3n, it is preferable that the following conditions are satisfied:

$$\nu 3p > \nu 3n \quad (10)$$

$$n3p < n3n \quad (11)$$

By satisfying these conditions, the off-axis chromatic aberration can be corrected effectively.

According to the configuration of the projection lens 24 of this embodiment described above, it is possible to provide a projection lens that is especially suited for use in performing right projection using a reflective spatial light modulator such as a DMD, shows good aberration performance even under bright conditions in which the F number is about 2.0, and can realize specifications required for a projection display apparatus, such as a wide angle, a long back focus, and a high relative illumination, with a rational configuration.

Fourth Embodiment

Figure 20:
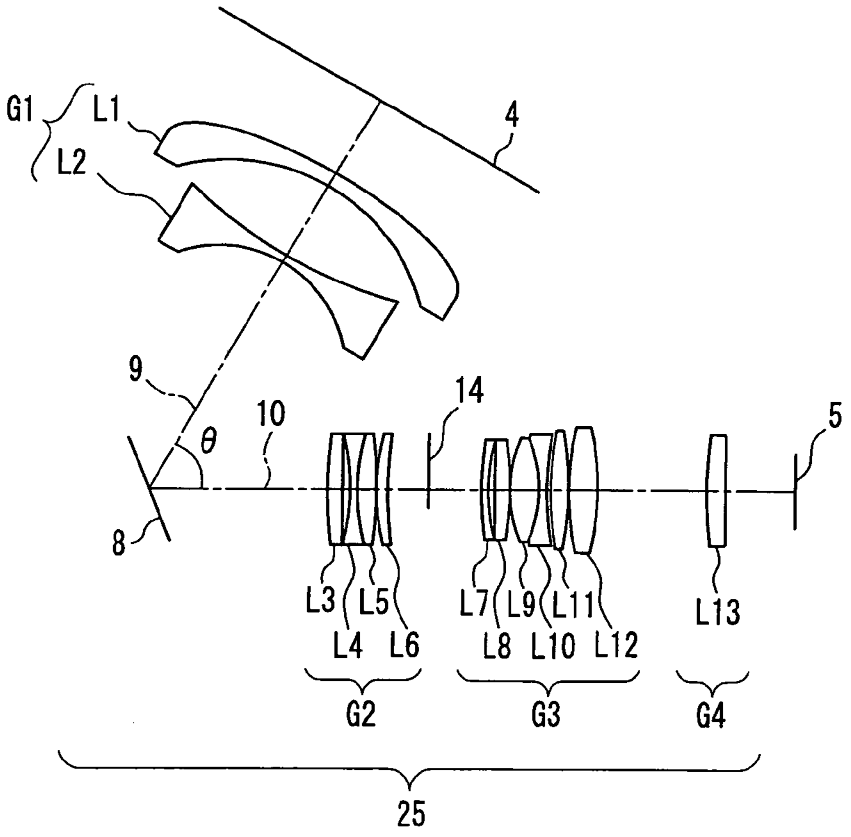
FIG. 20 is a layout drawing showing a configuration of a projection lens according to a fourth embodiment of the present invention.

FIG. 20 is a layout drawing showing a configuration of a projection lens according to the fourth embodiment of the present invention.

As shown in FIG. 20, a projection lens 25 of this embodiment is constituted by a first lens group G1 having a negative power and composed of two lenses L1 and L2, which serves as the front lens group, a second lens group G2 having a positive power and composed of four lenses L3, L4, L5, and L6, which serves as the rear lens group, a third lens group G3 having a positive power and composed of six lenses L7, L8, L9, L10, L11, and L12, which also serves as the rear lens group, and a fourth lens group G4 having a positive power and composed of a single lens L13 that are arranged in this order from the screen 4 side toward the image plane 5 side.

Moreover, as in the case of the projection lens 23 of the second embodiment, a plane mirror 8 serving as the optical path bending means is disposed between the first lens group G1 and the second lens group G2. The angle θ between optical axes 9 and 10 upstream and downstream of the plane mirror 8 can be set appropriately in the same manner as described in the second embodiment, and it is set that θ=65° in this embodiment.

An aperture stop 14 is disposed between the second lens group G2 and the third lens group G3, and has an opening that is eccentric with respect to the optical axes 9 and 10 common to the front lens group and the rear lens group that are located upstream and downstream of the plane mirror 8.

In this embodiment, the aperture stop 14 is eccentrically displaced in a direction that is parallel to a plane (the sheet surface) containing the optical axes 9 and 10 upstream and downstream of the plane mirror 8 and that is perpendicular to the optical axis 10. That is to say, when the effective display area of a DMD serving as the spatial light modulator has a rectangular shape having a long axis and a short axis, the aperture stop 14 is displaced eccentrically in a direction along the short axis. The specific opening shape and amount of eccentricity of the aperture stop 14 can be set appropriately in the same manner as described in the first embodiment, and in this embodiment, the long axis A=22.2 mm, the short axis B=14.8 mm, the amount of eccentricity D1 of the aperture stop 14=4.6 mm, the effective aperture radius D2 in the position of the aperture stop 14=12.0 mm (see FIG. 14).

In the projection lens 25 of this embodiment, the first to fourth lens groups G1 to G4 and the image plane 5 are arranged such that the optical axes 9 and 10 common to the first to fourth lens groups G1 to G4 pass through the center of the image plane 5, and thus it is possible to perform right projection of an optical image formed on the spatial light modulator onto the screen 4.

Hereinafter, the lens configuration of the projection lens 25 of this embodiment will be described more specifically.

The first lens group G1 is composed of the negative meniscus lens L1 whose convex surface faces the screen 4 side, and the negative lens L2 that are arranged in this order from the screen 4 side, and has a negative refractive power as a whole. Both surfaces of the negative meniscus lens L1 are aspherical. By disposing the aspherical surface in a position that is the closest to the screen 4 in the first lens group G1 and where the height of off-axis rays is the highest, a large distortion that occurs in the first lens group G1 can be corrected, and also the balance of the off-axis aberrations can be controlled appropriately.

The second lens group G2 is composed of the positive lens L3, a cemented lens of the negative lens L4 and the positive lens L5, and the positive meniscus lens L6 whose convex surface faces the screen 4 side that are arranged in this order from the screen 4 side, and has a positive refractive power as a whole.

The third lens group G3 is composed of the negative meniscus lens L7 whose convex surface faces the screen 4 side, the positive lens L8, a cemented lens of the positive lens L9 and the negative lens L10, the positive lens L11, and the positive lens L12 that are arranged in this order from the screen 4 side, and has a positive refractive power as a whole.

The positive lens L12 disposed in a position closest to the image plane 5 (the spatial light modulator) in the third lens group G3 is made of anomalous dispersion glass. By employing the anomalous dispersion glass in this portion, the off-axis chromatic aberration, which cannot be completely corrected by the cemented lens, can be corrected.

The fourth lens group G4 is composed of the single plano-convex lens L13 whose convex surface faces the screen 4 side, and has a positive refractive power.

The following (Table 15) shows specific numerical examples for the lenses of the projection lens 25 shown in FIG. 20.

TABLE 15

| Lens | i-th surface | ri | di | ni | νi |
|---|---|---|---|---|---|
| L1 | 1 | 75.819 | 3.800 | 1.49015 | 57.2 |
| | 2 | 28.397 | 22.400 | | |
| L2 | 3 | −143.750 | 2.200 | 1.58913 | 61.3 |
| | 4 | 26.920 | 49.500 | | |
| | 5 | Infinity | 27.500 | | |
| L3 | 6 | 122.160 | 3.100 | 1.80609 | 33.3 |
| | 7 | −186.000 | 1.300 | | |
| L4 | 8 | −50.246 | 1.400 | 1.69680 | 55.5 |
| L5 | 9 | 41.810 | 4.500 | 1.64769 | 33.8 |
| | 10 | −126.000 | 0.300 | | |
| L6 | 11 | 37.30 | 3.000 | 1.62004 | 36.3 |
| | 12 | 94.210 | 5.000 | | |
| | 13 | Infinity | 15.000 | | |
| L7 | 14 | 131.950 | 1.300 | 1.80609 | 33.3 |
| | 15 | 40.409 | 1.600 | | |
| L8 | 16 | 138.690 | 3.700 | 1.48749 | 70.4 |
| | 17 | −58.300 | 0.300 | | |
| L9 | 18 | 50.500 | 7.300 | 1.49700 | 81.6 |
| L10 | 19 | −27.200 | 1.500 | 1.80609 | 33.3 |
| | 20 | 71.850 | 0.700 | | |
| L11 | 21 | 128.160 | 4.300 | 1.48749 | 70.4 |
| | 22 | −70.570 | 0.300 | | |
| L12 | 23 | 59.510 | 7.000 | 1.49700 | 81.6 |
| | 24 | −48.82 | 31.000 | | |
| L13 | 25 | 75.500 | 5.000 | 1.83400 | 37.3 |
| | | Infinity | 15.430 | | |

(Aspherical surface data)

| Lens | i-th surface | cc | A4 | A6 | A8 | A10 |
|---|---|---|---|---|---|---|
| L1 | 1 | −24.28822 | 2.97888E−06 | 8.78179E−10 | −1.07634E−12 | 4.32077E−16 |
| | 2 | −0.77538 | −6.35826E−06 | 9.94300E−09 | −9.44795E−12 | 2.03492E−15 |

Moreover, the focal length of the entire system is f=9.963 mm, the F number is F no.=2.01, and the half angle of view is ω=45.2°.

It should be noted that the effective F number for the opening of the eccentric aperture stop 14 is about 2.7.

Also in the projection lens 25 of this embodiment, it is preferable that the condition (1) to (8) are satisfied.

The following (Table 16) shows the values of the above-described conditions regarding the projection lens 25 of this embodiment.

TABLE 16

| | | |
|---|---|---|
| t12/f = 7.8 | t34/f = 3.1 | |
| t34/d = 2.0 | (t34 + d)/f = 4.7 | |
| f1/f = −2.4 | f2/f = 8.7 | f3/f = 6.3 |
| D1/D2 = 0.38 | | |

Figure 21:
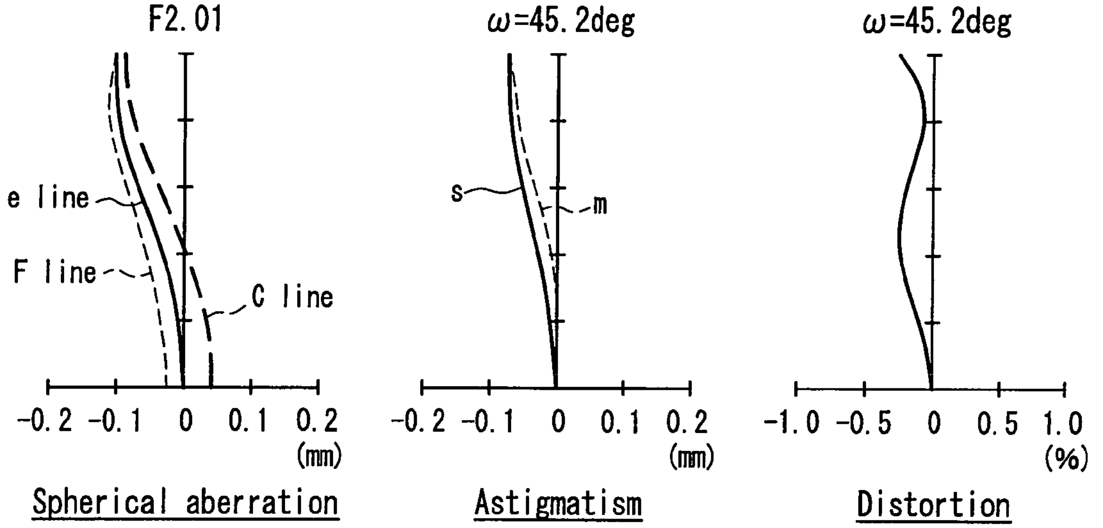
FIG. 21 shows aberration performance charts (spherical aberration, astigmatism, distortion) of the projection lens according to the fourth embodiment of the present invention.

FIG. 21 shows aberration performance charts (spherical aberration, astigmatism, distortion) of the projection lens 25 shown in FIG. 20.

As is clear from the aberration performance charts shown in FIG. 21, it is seen that in the projection lens 25 of this embodiment, the aberrations were corrected sufficiently by satisfying the various conditions described above, and thus good imaging performance was achieved.

In the projection lens 25 of this embodiment, when the Abbe number and the refractive index of the positive lens L5 constituting the cemented lens included in the second lens group G2 are respectively $\nu 2p$ and $n2p$, and the Abbe number and the refractive index of the negative lens L4 constituting the cemented lens included in the second lens group G2 are respectively $\nu 2n$ and $n2n$, it is preferable that the following conditions are satisfied:

$$\nu 2p < \nu 2n \quad (8)$$

$$n2p < n2n \quad (9)$$

Moreover, in the projection lens 25 of this embodiment, when the Abbe number and the refractive index of the positive lens L9 constituting the cemented lens included in the third lens group G3 are respectively $\nu 3p$ and $n3p$, and the Abbe number and the refractive index of the negative lens L10 constituting the cemented lens included in the third lens group G3 are respectively $\nu 3n$ and $n3n$, it is preferable that the following conditions are satisfied:

$$\nu 3p > \nu 3n \quad (10)$$

$$n3p < n3n \quad (11)$$

By satisfying these conditions, the off-axis chromatic aberration can be corrected effectively.

According to the configuration of the projection lens 25 of this embodiment described above, it is possible to provide a projection lens that is especially suited for use in performing right projection using a reflective spatial light modulator such as a DMD, shows good aberration performance even under bright conditions in which the F number is about 2.0, and can realize specifications required for a projection display apparatus, such as a wide angle, a long back focus, and a high relative illumination, with a rational configuration.

In Reference Examples 1 to 4 above and the first to fourth embodiments, the case where both surfaces of the lens L1 on the screen 4 side that constitutes the first lens group G1 are aspherical is described as an example. However, it is also possible that only one of the surfaces of the lens L1 is aspherical, as long as the aberrations can be corrected so that the desired purpose can be attained.

Moreover, a specific lens configuration of the projection lens is not limited to those described in Reference Examples 1 to 4 above and the first to fourth embodiments. The intended object of the present invention can be attained, as long as the projection lens is configured such that a front lens group and a rear lens group are provided in this order from the screen 4 side toward the image plane 5 side, the rear lens group has an aperture stop 14 that is eccentric with respect to an optical axis 7 (or 9) common to the front lens group and the rear lens group, and focus adjustment is performed by moving the rear lens group in the direction of the optical axis 7 (or 9) without rotating it.

Moreover, in Reference Examples 1 to 4 above and the first to fourth embodiments, the case where the fourth lens group G4 serving as the auxiliary lens group is composed of a single plano-convex lens whose convex surface faces the screen 4 side is described as an example. However, the fourth lens group G4 serving as the auxiliary lens group is not necessarily limited to such a configuration, and the fourth lens group G4 may be constituted by a plurality of lenses or the convex surface may face the image plane 5 side.

Fifth Embodiment

Figure 22:
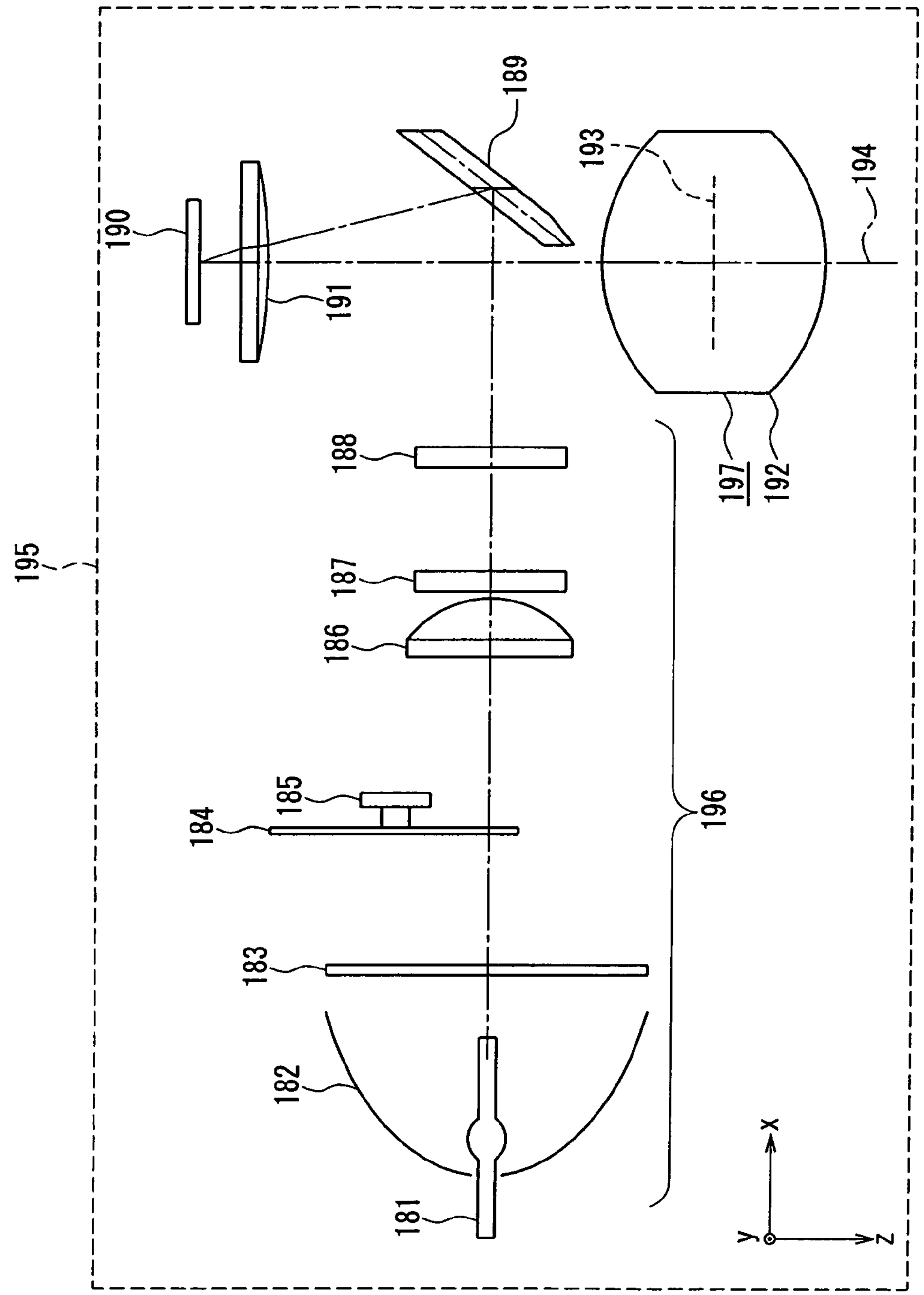
FIG. 22 is a layout drawing (x-z plan view) showing a configuration of a projection display apparatus according to a fifth embodiment of the present invention.
Figure 23:
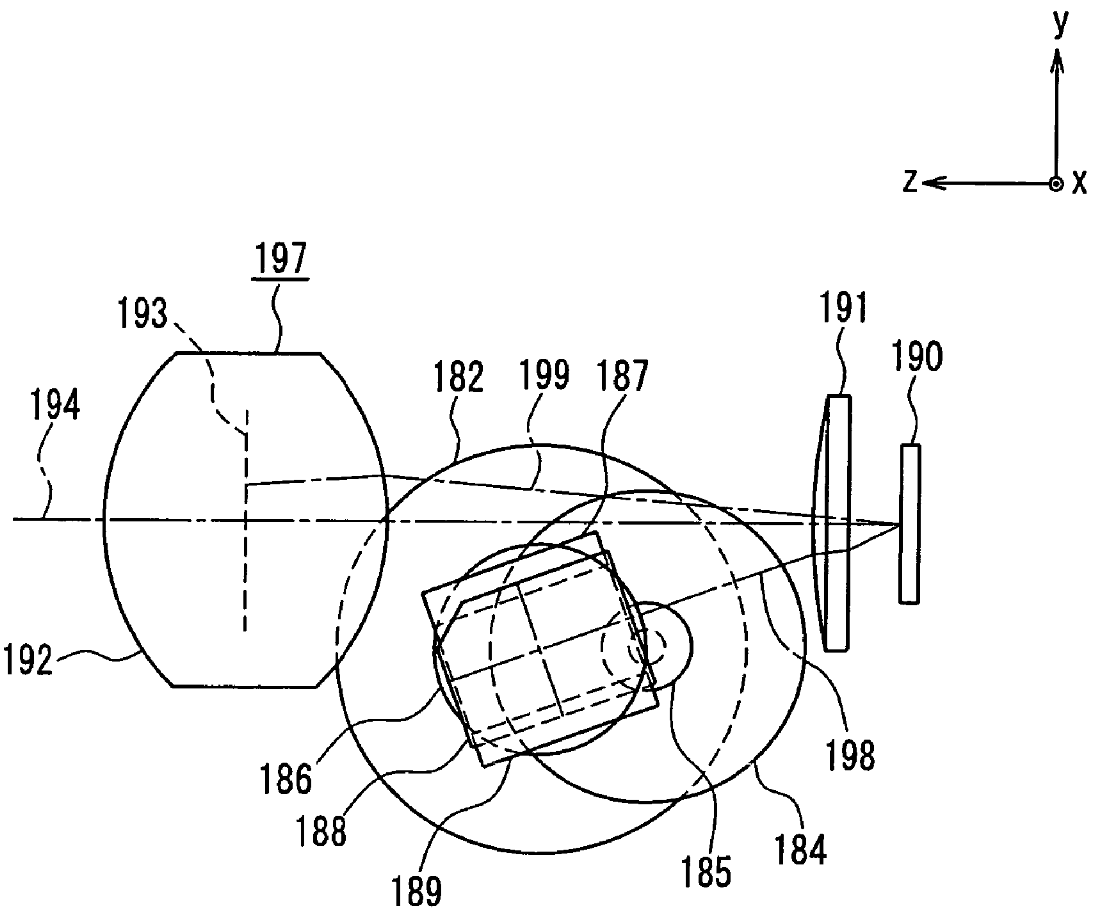
FIG. 23 is a layout drawing (y-z plan view) showing the configuration of the projection display apparatus according to the fifth embodiment of the present invention.
Figure 24:
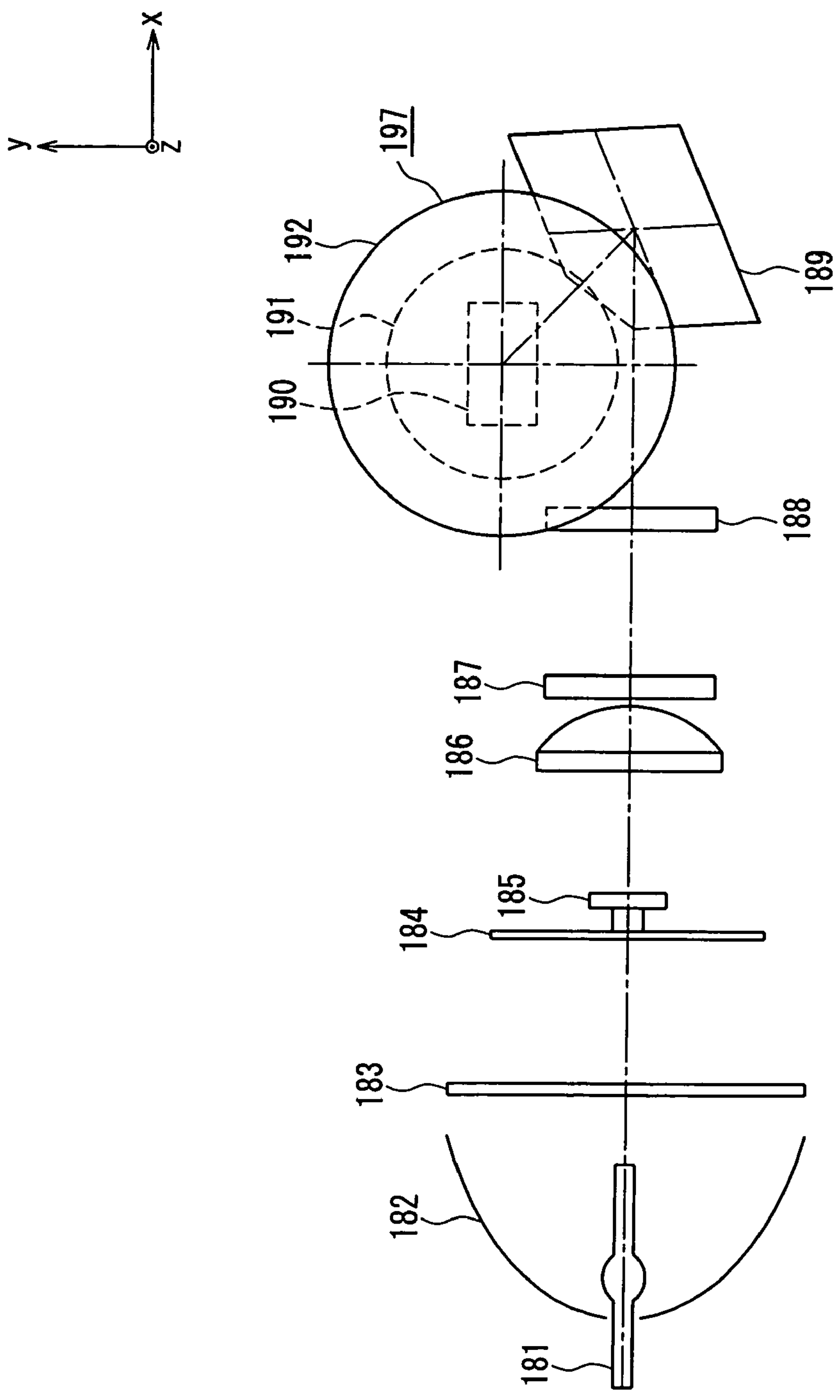
FIG. 24 is a layout drawing (x-y plan view) showing the configuration of the projection display apparatus according to the fifth embodiment of the present invention.

FIGS. 22 to 24 are layout drawings showing a configuration of a projection display apparatus according to a fifth embodiment of the present invention. FIG. 22 shows the configuration for the x-z plane, FIG. 23 shows the configuration for the y-z plane, and FIG. 24 shows the configuration for the x-y plane.

As shown in FIGS. 22 to 24, a projection optical system 195 of the projection display apparatus of this embodiment includes a DMD 190 serving as a spatial light modulator for forming an optical image according to a video signal, an illumination optical system 196 whose illustrated elements include a lamp 181 through a plane mirror 189 and serving as an illuminating means for illuminating the DMD 190, and a projection lens 197 for projecting the optical image formed on the DMD 190 onto a screen (not shown).

The illumination optical system 196 provides illumination light for illuminating the DMD 190. More specifically, the illumination optical system 196 collects light emitted from the lamp 181 with an ellipsoidal mirror 182, allows the emitted light to pass through an V-IR cut-off filter 183 for eliminating ultraviolet rays and infrared rays from the emitted light, and then forms a focused light spot near a rotary color filter 184.

As the lamp 181, an extra-high pressure mercury lamp, a xenon lamp, and the like can be used. Since these lamps achieve a high luminance with a relatively small light emitting portion, the emitted light can be collected efficiently by the ellipsoidal mirror 182.

The rotary color filter 184 is formed by combining red, green, and blue color filters into the form of a disc, and when the rotary color filter 184 is rotated with a motor 185, it can selectively transmit red, green, and blue colors of light of the light collected by the ellipsoidal mirror 182 in sequence. Thus, the illumination optical system 196 serving as the illuminating means forms illumination light that is switched between the three primary colors, red (R), green (G), and blue (B), of light with time, and the DMD 190 serving as the spatial light modulator can display optical images corresponding to the three primary colors of light while switching the optical images with time.

The divergent light that has passed through the rotary color filter 184 is collected by a condenser lens 186, and then illuminates the DMD 190 via a first lens array 187, a second lens array 188, the plane mirror 189, and a lens 191.

Figure 25A:
FIG. 25 shows a configuration of a first lens array constituting an illumination optical system of the projection display apparatus according to the fifth embodiment of the present invention, with FIG. 25A showing a sectional view, and FIG. 25B showing a plan view.
Figure 25B:
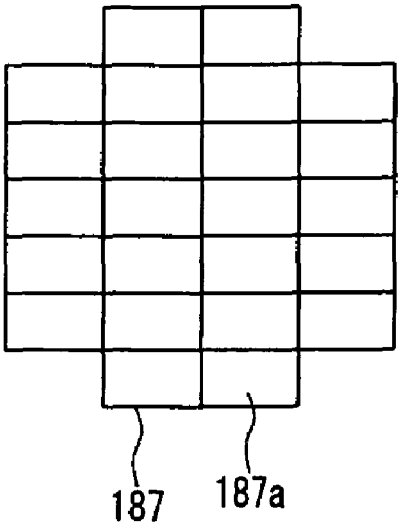

FIG. 25 shows a configuration of the first lens array 187. FIG. 25A shows a sectional view, and FIG. 25B shows a plan view. As shown in FIG. 25, the first lens array 187 has a two-dimensional array of a plurality of first lenses 187*a* having a shape approximately similar to that of the DMD 190. Thus, when a light beam collected by the condenser lens 186 enters the first lens array 187, the light beam is divided into a plurality of small light beams by the first lenses 187*a*.

Figure 26A:
FIG. 26 shows a configuration of a second lens array constituting the illumination optical system of the projection display apparatus according to the fifth embodiment of the present invention, with FIG. 26A showing a sectional view, and FIG. 26B showing a plan view.
Figure 26B:
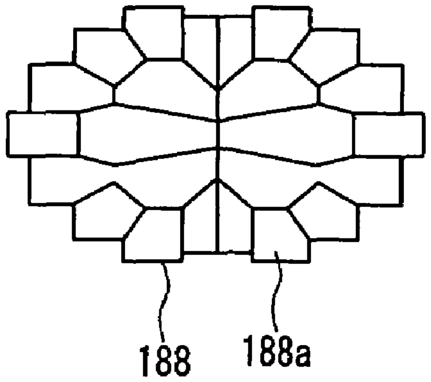

FIG. 26 shows a configuration of the second lens array 188. FIG. 26A shows a sectional view, and FIG. 26B shows a plan view. As shown in FIG. 26, the second lens array 188 has a two-dimensional array of a plurality of second lenses 188*a* equal in number to the first lenses 187*a* and each paired with a corresponding first lens 187*a*.

The first lenses 187*a* focus the small light beams incident on the first lenses 187*a* onto the respective corresponding second lenses 188*a*. For this purpose, the individual first lenses 187*a* are arranged such that they are decentered appropriately according to the arrangement of the second lenses 188*a*. Moreover, the second lenses 188*a* magnify the small light beams that have been incident on the respective corresponding first lenses 187*a* to form an image on the DMD 190. For this purpose, the individual second lenses 188*a* are arranged such that they are decentered appropriately according to the positional relationships between the respective corresponding first lenses 187*a* and the DMD 190.

By using the first and second lens arrays 187 and 188 as optical components in the illumination optical system 196 as described above, the light beam collected by the condenser lens 186 and having relatively large unevenness in brightness and color can be divided into a plurality of small light beams by the first lenses 187*a*, and those small light beams can be magnified by the corresponding second lenses 188*a* and superimposed on the DMD 190, so that uniform illumination with small unevenness in brightness and color can be realized.

Figure 30:
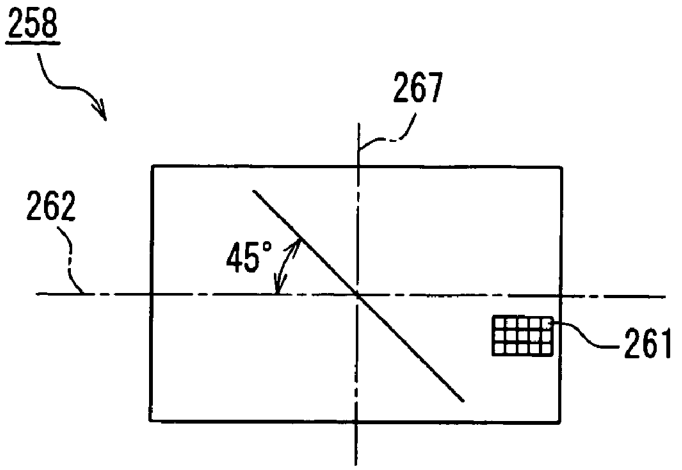
FIG. 30 is a schematic view for explaining the operating principle of the DMD.

The DMD 190 is, like that shown in FIG. 30, a reflective spatial light modulator having a two-dimensional array of microscopic mirrors that are provided in one-to-one correspondence with pixels. By controlling the direction of reflection of light by changing the tilt angles of the microscopic mirrors, illumination light incident thereon can be modulated. The tilt angle of each microscopic mirror of the DMD 190 shown in FIG. 22 is ±12°.

An optical image resulting from the above-described modulating effect is formed on the DMD 190, and this optical image is then magnified and projected onto the screen by the projection lens 197.

The projection lens 197 has the same configuration as the projection lens of the fourth embodiment shown in FIG. 20, and is constituted by a main lens group 192 including first to third lens groups and a fourth lens group composed of a plano-convex lens 191 and serving as an auxiliary lens group. Thus, the projection lens 197 has good imaging performance as shown in FIG. 21, and can provide a high-quality projected image. Moreover, since a sufficiently long air gap is reserved between the third lens group (lens group on the plano-convex lens 191 side in the main lens group 192) and the fourth lens group (plano-convex lens 191), the plane mirror 189 of the illumination optical system 196 can be disposed in that space, and consequently the size of the projection display apparatus can be reduced.

Furthermore, as shown in FIG. 23, an aperture stop 193 of the projection lens 197 is eccentric with respect to an optical axis 194, and also has an elliptical opening as shown in FIG. 14. Thus, the angle between an optical axis 198 of illumination light and an optical axis 199 of projection light is increased (projection light and illumination light can be separated from each other), and thus a configuration is realized in which, despite right projection being performed, interference between the projection lens 197 and an optical component such as the plane mirror 189 tends not to occur.

Moreover, the plano-convex lens 191 is shared by optical paths of illumination light (optical axis 198) and projection light (optical axis 199), and allows the aperture stop 193 of the projection lens 197 and the surface of the second lens array 188 to have a conjugate relationship with each other. Thus, as shown in FIG. 26, the second lens array 188 is designed to have an elliptical external shape approximately similar to that of the opening of the aperture stop 193 so that illumination light can pass through the aperture stop 193 efficiently.

In this embodiment, the case where the projection lens described in the fourth embodiment is used as the projection lens 197 is described as an example. However, equivalent effects also can be obtained by using the projection lenses described in the first to third embodiments.

Moreover, if a field stop is disposed on the screen side of the projection lens 197, then unwanted light from the projection display apparatus can be blocked.

According to the configuration of the projection display apparatus of this embodiment described above, a compact, low-cost projection display apparatus that is capable of providing bright, high-quality image display can be provided because one of the projection lenses described in the first to fourth embodiments that are especially suited for use in performing right projection using a reflective spatial light modulator such as a DMD, show good aberration performance even under bright conditions in which the F number is about 2.0, and can realize specifications required for a projection display apparatus, such as a wide angle, a long back focus, and a high relative illumination, with a rational configuration is employed.

Sixth Embodiment

Figure 27A:
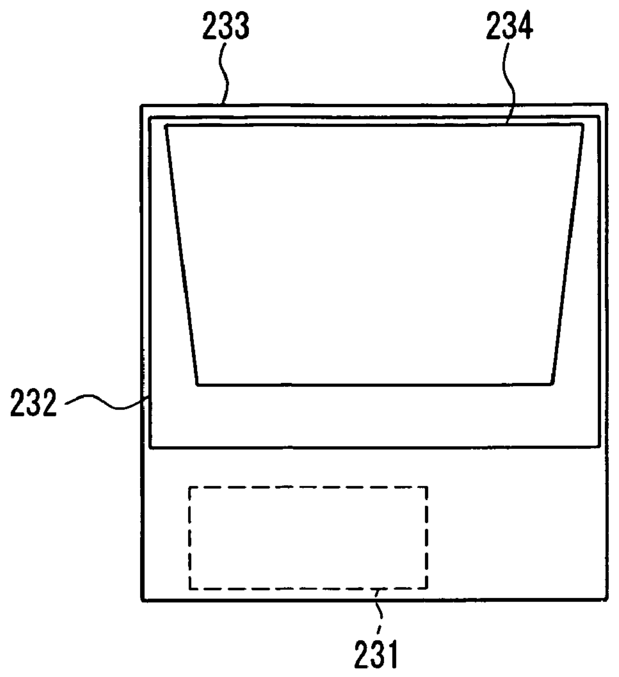
FIG. 27 is a layout drawing showing a rear projection display apparatus according to a sixth embodiment of the present invention, with FIG. 27A showing a front view, and FIG. 27B showing a side view.
Figure 27B:
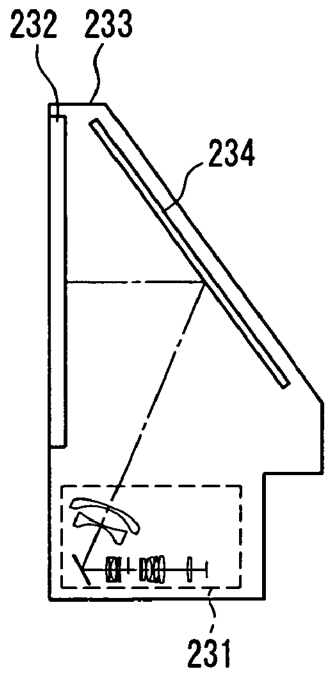

FIG. 27 is a layout drawing showing a rear projection display apparatus according to a sixth embodiment of the present invention. FIG. 27A shows a front view, and FIG. 27B shows a side view.

As shown in FIG. 27, the rear projection display apparatus of this embodiment includes a projection display apparatus 231 and a transmission-type screen 232 on which an image projected from the projection display apparatus 231 is displayed. As the projection display apparatus 231, one that has the same configuration as the projection display apparatus described in the fifth embodiment is used, and the projection display apparatus 231 is disposed within a casing 233 supporting the transmission-type screen 232.

Outgoing light from a projection lens of the projection display apparatus 231 is reflected by a fold mirror 234 that is disposed between the projection display apparatus 231 and the transmission-type screen 232 and that serves as a reflecting means for bending an optical path, and enters the transmission-type screen 232.

The transmission-type screen 232 is constituted by, for example, a Fresnel lens and a lenticular lens. The focal length of the Fresnel lens is set almost equal to the optical path length from the Fresnel lens to the projection lens, and the Fresnel lens transmits incident light to the front of the transmission-type screen 232 while refracting the incident light appropriately. The viewer can observe an image magnified and projected by the projection display apparatus 231 through the transmission-type screen 232.

According to the configuration of the rear projection display apparatus of this embodiment described above, a compact, low-cost rear projection display apparatus that is capable of providing bright, high-quality image display can be provided because a projection display apparatus provided with one of the projection lenses described in the first to fourth embodiments that are especially suited for use in performing right projection using a reflective spatial light modulator such as a DMD, show good aberration performance even under bright conditions in which the F number is about 2.0, and can realize specifications required for a projection display apparatus, such as a wide angle, a long back focus, and a high relative illumination, with a rational configuration is employed.

Seventh Embodiment

Figure 28:
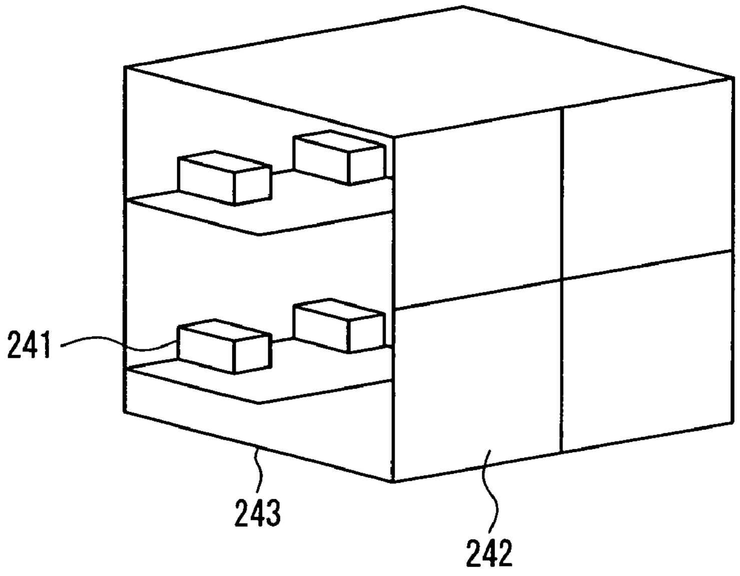
FIG. 28 is a layout drawing showing a rear projection display apparatus according to a seventh embodiment of the present invention.
Figure 29A:
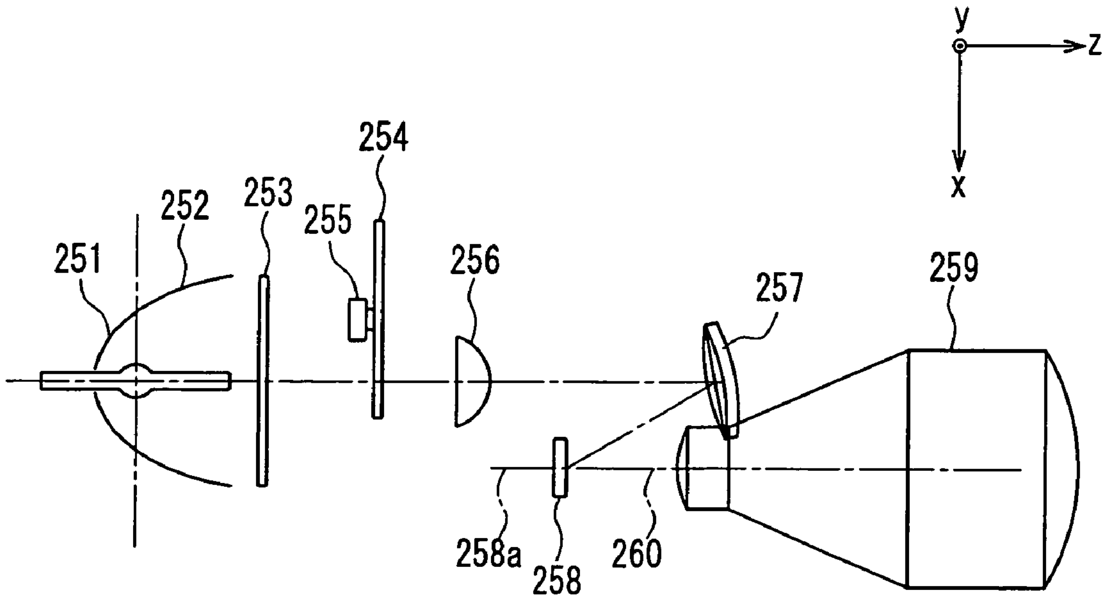
FIG. 29 is a layout drawing showing a configuration of a conventional projection display apparatus using a DMD as a spatial light modulator, with FIG. 29A showing a plan view, and FIG. 29B showing a side view.
Figure 29B:
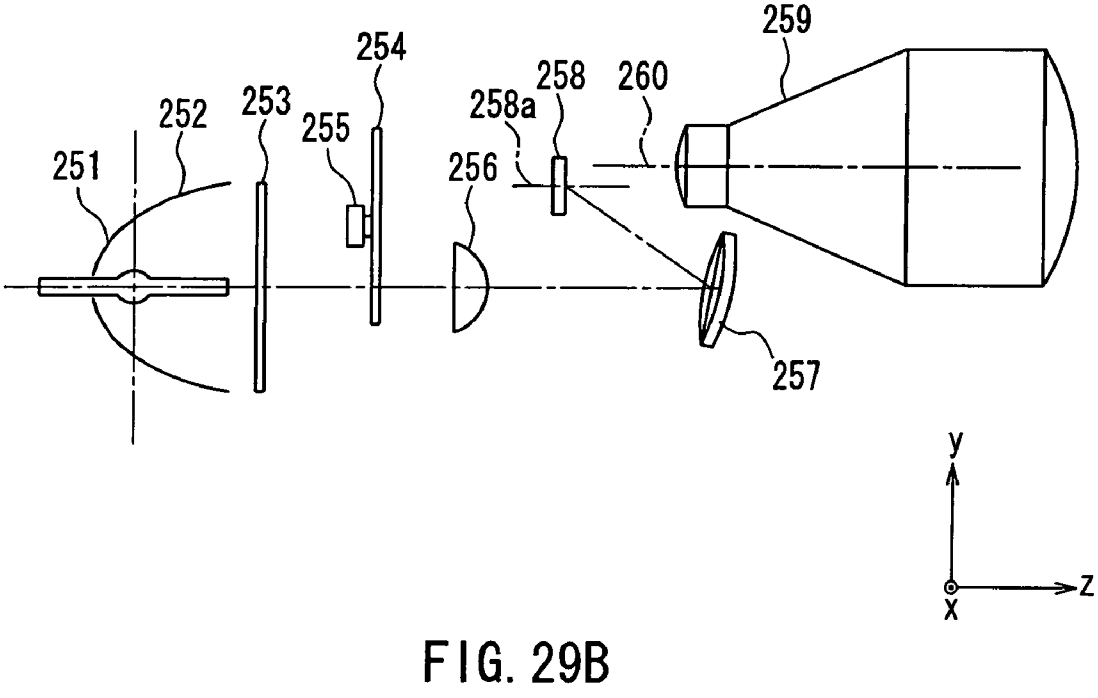

FIG. 28 is a layout drawing showing a rear projection display apparatus according to a seventh embodiment of the present invention.

In FIG. 28, reference numeral 241 denotes a projection display apparatus, and as the projection display apparatus 241, one that has the same configuration as the projection display apparatus described in the fifth embodiment is used. Within a casing 243 supporting four transmission-type screens 242, a plurality of projection display apparatuses 241 are provided, equal in number to the transmission-type screens 242 and each paired with a corresponding transmission-type screen 242.

When multi-screen display is performed by arranging images from the plurality of projection display apparatuses 241, it is preferred that the differences in brightness, resolution, and white balance between opposite sides of the boundary between the unit screens are small. In the rear projection display apparatus of this embodiment, the projection display apparatus 241 having the same configuration as the projection display apparatus described in the fifth embodiment is used. As described above, since the projection display apparatus 241 is constituted by the illumination optical system that realizes uniform illumination with respect to brightness and color and the projection lens that realizes a highly uniform resolution, it is possible to reduce significantly variations in white balance, brightness, and resolution between the unit screens.

According to the configuration of the rear projection display apparatus of this embodiment described above, a compact, low-cost rear projection display apparatus that is capable of providing bright, high-quality image display can be provided as in the case of the sixth embodiment.

In the fifth to seventh embodiments, the case where a reflective DMD is used as the spatial light modulator is described as an example. However, as the spatial light modulator, for example, a device having a configuration in which a reflection-type or a transmission-type liquid crystal panel is employed may be used.

Figure 31:
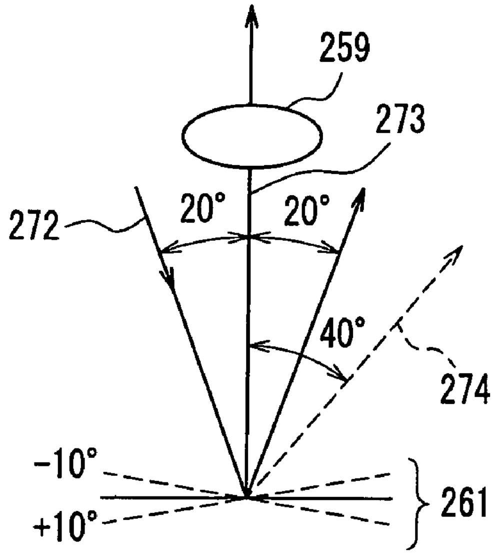
FIG. 31 is a schematic diagram showing the operating principle of a microscopic mirror on the DMD.

Moreover, as the DMD, it is possible to use, for example, a DMD in which the tilt angle or the tilt direction of the microscopic mirrors is different from those shown in FIGS. 30 and 31 or described in the foregoing embodiments.

Moreover, in the fifth to seventh embodiments, the illumination optical system 196 including the first and second lens arrays 187 and 188 is described as an example of the illuminating means. However, the illuminating means may have a configuration in which the first and second lens arrays are not used or a configuration in which an integrator element such as a glass rod is used.

INDUSTRIAL APPLICABILITY

As described above, the projection lens of the present invention is especially suited for use in performing right projection using a reflective spatial light modulator such as a DMD, shows good aberration performance even under bright conditions in which the F number is about 2.0, and can realize specifications required for a projection display apparatus, such as a wide angle, a long back focus, and a high relative illumination, with a rational configuration, and thus can be utilized to realize a compact, low-cost projection display apparatus or rear projection display apparatus that is capable of providing bright, high-quality image display.

The invention claimed is:

1. A projection lens for magnifying and projecting an optical image formed on a spatial light modulator onto a screen, comprising:

a front lens group and a rear lens group that are arranged in this order from the screen side toward an image plane side, the rear lens group being movable in a direction of an optical axis without rotation to provide focus adjustment wherein the rear lens group has an aperture stop that is eccentric with respect to an optical axis common to the front lens group and the rear lens group.

2. The projection lens according to claim 1, wherein magnification adjustment is performed by moving the front lens group in the direction of the optical axis.

3. The projection lens according to claim 1, further comprising an auxiliary lens group between the rear lens group and the image plane.

4. The projection lens according to claim 1, wherein the aperture stop is eccentrically displaced in a direction that is parallel to a plane containing the optical axes upstream and downstream of the optical path bending means and that is perpendicular to the optical axis of the rear lens group.

5. The projection lens according to claim 1, wherein when an angle between the optical axes upstream and downstream of the optical path bending means is θ, the following relationship is satisfied:

$$45° \leqq \theta \leqq 90° \quad (13).$$

6. The projection lens according to claim 1, wherein the aperture stop has an opening having a substantially elliptical shape.

7. The projection lens according to claim 6, wherein when an amount of eccentricity of the aperture stop is D1 and an effective aperture radius in a position of the aperture stop is D2, the following condition is satisfied:

$$D1/D2 < 0.5 \quad (12).$$

8. The projection lens according to claim 1, wherein an effective display area of the spatial light modulator has a rectangular shape having a long axis and a short axis, and the aperture stop is eccentrically displaced in a direction along the long axis or a direction along the short axis.

9. The projection lens according to claim 3, wherein the front lens group comprises a first lens group having a negative power, the rear lens group comprises a second lens group having a positive power and a third lens group having a positive power that are arranged in this order from the screen side, the auxiliary lens group comprises a fourth lens group having a positive power, and when an axial air gap between the first lens group and the second lens group is t12, an axial air gap between the third lens group and the fourth lens group is t34, and a focal length of the entire system is f, the following conditions are satisfied:

$$6.2 < t12/f < 10.5 \quad (1)$$

$$2.7 < t34/f < 4.4 \quad (2).$$

10. The projection lens according to claim 9, wherein the aperture stop is disposed between the second lens group and the third lens group.

11. The projection lens according to claim 9, wherein the first lens group comprises a negative meniscus lens whose convex surface faces the screen side and at least one surface of which is aspherical, and a negative lens that are arranged in this order from the screen side, the second lens group comprises a positive lens, a cemented lens of a negative lens and a positive lens, and a positive meniscus lens whose convex surface faces the screen side that are arranged in this order from the screen side, the third lens group comprises a negative meniscus lens whose convex surface faces the screen side, a positive lens, a cemented lens of a positive lens and a negative lens, a positive lens, and a positive lens that are arranged in this order from the screen side, and the fourth lens group comprises a single positive lens.

12. The projection lens according to claim 9, wherein the first lens group comprises a negative meniscus lens whose convex surface faces the screen side and at least one surface of which is aspherical, and a negative lens that are arranged in this order from the screen side, the second lens group comprises a positive lens, a negative meniscus lens whose convex surface faces the screen side, and a positive meniscus lens whose convex surface faces the screen side that are arranged in this order from the screen side, the third lens group comprises a first cemented lens of a negative lens and a positive lens, a second cemented lens of a negative lens and a positive lens, and a positive lens that are arranged in this order from the screen side, and the fourth lens group comprises a single positive lens.

13. The projection lens according to claim 9, wherein a lens that is disposed in a position closest to the screen in the first lens group is an aspherical lens.

14. The projection lens according to claim 3, wherein the auxiliary lens group comprises a single plano-convex lens whose convex surface faces the screen side.

15. The projection lens according to claim 9, wherein a lens that is disposed in a position closest to the spatial light modulator in the third lens group is made of an anomalous dispersion glass.

16. The projection lens according to claim 9, wherein when an axial air gap between the fourth lens group and the image plane is d, the following conditions are satisfied:

$$1.6 < t34/d < 2.6 \quad (3)$$

$$4.2 < (t34+d)/f < 6.0 \quad (4).$$

17. The projection lens according to claim 9, wherein when a focal length of the first lens group is f1, a focal length of the second lens group is f2, and a focal length of the third lens group is f3, the following conditions are satisfied:

$$-2.9<f1/f<-2.1 \quad (5)$$

$$7.3<f2/f<14.5 \quad (6)$$

$$5.7<f3/f<7.5 \quad (7).$$

18. The projection lens according to claim 1, wherein the optical path bending means is a dielectric multilayer mirror.

19. The projection lens according to claim 11, wherein when an Abbe number and a refractive index of the positive lens constituting the cemented lens included in the second lens group are respectively v2p and n2p, and an Abbe number and a refractive index of the negative lens constituting the cemented lens included in the second lens group are respectively v2n and n2n, the following conditions are satisfied:

$$v2p<v2n \quad (8)$$

$$n2p<n2n \quad (9).$$

20. The projection lens according to claim 11, wherein when an Abbe number and a refractive index of the positive lens constituting the cemented lens included in the third lens group are respectively v3p and n3p, and an Abbe number and a refractive index of the negative lens constituting the cemented lens included in the third lens group are respectively v3n and n3n, the following conditions are satisfied:

$$v3p>v3n \quad (10)$$

$$n3p<n3n \quad (11).$$

21. A projection display apparatus, comprising:

a spatial light modulator for forming an optical image according to a video signal, an illuminating means for illuminating the spatial light modulator, and a projection lens for projecting the optical image formed on the spatial light modulator onto a screen, wherein the projection lens according to claim 1 is used as the projection lens.

22. The projection display apparatus according to claim 21, wherein the spatial light modulator is a DMD (Digital Micro-Mirror Device) comprising a two-dimensional array of a plurality of microscopic mirrors.

23. The projection display apparatus according to claim 21, further comprising a field stop on the screen side of the projection lens.

24. The projection display apparatus according to claim 21, wherein the illuminating means forms an illumination light that is switched between three primary colors, red (R), green (G), and blue (B), of light with time, and the spatial light modulator displays the optical images corresponding to the three primary colors of light while switching the optical images with time.

25. A rear projection display apparatus, comprising:

a projection display apparatus, and a transmission-type screen for displaying an image projected from the projection display apparatus, wherein the projection display apparatus according to claim 21 is used as the projection display apparatus.

26. The rear projection display apparatus according to claim 25, further comprising a reflecting means for bending an optical path that is disposed between the projection display apparatus and the transmission-type screen.

27. The projection lens according to claim 12, wherein when an Abbe number and a refractive index of the positive lens constituting the cemented lens included in the third lens group are respectively v3p and n3p, and an Abbe number and a refractive index of the negative lens constituting the cemented lens included in the third lens group are respectively v3n and n3n, the following conditions are satisfied:

$$v3p>v3n \quad (10)$$

$$n3p<n3n \quad (11).$$

* * * * *